United States Patent
Darrah et al.

(10) Patent No.: US 12,529,290 B2
(45) Date of Patent: Jan. 20, 2026

(54) HYDROGEN PRODUCTION AND SULFUR-CARBON SEQUESTRATION

(71) Applicant: Koloma, Inc., Dublin, OH (US)

(72) Inventors: Thomas Darrah, Dublin, OH (US); Colin Whyte, Dublin, OH (US); Jacob Harrington, Dublin, OH (US); Peter Johnson, Dublin, OH (US)

(73) Assignee: Koloma, Inc., Denver, CO (US)

( * ) Notice: Subject to any disclaimer, the term of this patent is extended or adjusted under 35 U.S.C. 154(b) by 0 days.

(21) Appl. No.: 18/133,889

(22) Filed: Apr. 12, 2023

(65) Prior Publication Data

US 2023/0323756 A1 Oct. 12, 2023

Related U.S. Application Data

(60) Provisional application No. 63/330,216, filed on Apr. 12, 2022, provisional application No. 63/330,223, (Continued)

(51) Int. Cl.
*E21B 41/00* (2006.01)
*C01B 3/06* (2006.01)
(Continued)

(52) U.S. Cl.
CPC .......... *E21B 41/0064* (2013.01); *C01B 3/061* (2013.01); *C01B 3/065* (2013.01); *E21B 43/2405* (2013.01); *E21B 43/26* (2013.01)

(58) Field of Classification Search
CPC ....... Y02C 20/40; E21B 43/164; E21B 43/24; E21B 43/243; E21B 41/0064;
(Continued)

(56) References Cited

U.S. PATENT DOCUMENTS

| 4,078,904 A | 3/1978 | Galt |
| 4,382,912 A | 5/1983 | Madgavkar et al. |

(Continued)

FOREIGN PATENT DOCUMENTS

| CA | 2832461 A1 * | 4/2014 | ............ B01D 53/62 |
| CN | 214221410 U | 9/2021 | |

(Continued)

OTHER PUBLICATIONS

Kelemen , et al., "Engineered carbon mineralization in ultramafic rocks for CO2 removal from Air: Review and New Insights", (2020). Chemical Geology, 550, 119628. https://doi.org/10.1016/j.chemgeo.2020.119628.

(Continued)

*Primary Examiner* — Zakiya W Bates
(74) *Attorney, Agent, or Firm* — K&L Gates LLP

(57) ABSTRACT

Embodiments of the invention relate to producing hydrogen from a subsurface formation by injecting a reactant into the subsurface formation and reacting the reactant with the subsurface formation to form at least one of hydrogen gas or a mineralized product within the subsurface formation. The hydrogen produced is collected or one or more components of the reactant is sequestered to form a mineralized product in the subsurface formation. Other embodiments of the invention relate to producing hydrogen by injecting a thermal fluid into the subsurface rock formation, where the thermal fluid includes a reactant. The reactant is reacted with components in the subsurface formation to form at least one of hydrogen gas, mineralized sulfur, or mineralized carbon.

13 Claims, 7 Drawing Sheets

Related U.S. Application Data filed on Apr. 12, 2022, provisional application No. 63/330,220, filed on Apr. 12, 2022.

(51) Int. Cl.
  *E21B 43/24* (2006.01)
  *E21B 43/26* (2006.01)
(58) Field of Classification Search
  CPC .... E21B 43/295; E21B 43/00; E21B 43/2408;
        E21B 43/38; E21B 43/16; E21B 36/008;
                    E21B 43/26; E21B 43/247
  See application file for complete search history.

(56) References Cited

U.S. PATENT DOCUMENTS

| | | | |
|---|---|---|---|
| 7,426,959 | B2 | 9/2008 | Wang et al. |
| 8,136,592 | B2 | 3/2012 | Hsu et al. |
| 2003/0010652 | A1 | 1/2003 | Hunt |
| 2004/0146288 | A1 | 7/2004 | Mnegar et al. |
| 2006/0185985 | A1* | 8/2006 | Jones ............... C01D 7/14 423/220 |
| 2007/0298479 | A1 | 12/2007 | Larter et al. |
| 2008/0216774 | A1 | 9/2008 | Fulton et al. |
| 2009/0056941 | A1 | 3/2009 | Valdez |
| 2011/0146982 | A1 | 6/2011 | Kaminsky |
| 2011/0220351 | A1 | 9/2011 | Surguchev et al. |
| 2012/0134749 | A1 | 5/2012 | Darrah |
| 2013/0020073 | A1 | 1/2013 | Head |
| 2013/0113480 | A1 | 5/2013 | Kadayam et al. |
| 2013/0233057 | A1 | 9/2013 | Karoum et al. |
| 2014/0027119 | A1 | 1/2014 | De et al. |
| 2014/0114576 | A1 | 4/2014 | Jain et al. |
| 2014/0190691 | A1 | 7/2014 | Vinegar et al. |
| 2015/0361833 | A1 | 12/2015 | Hinders et al. |
| 2016/0186548 | A1 | 6/2016 | Pantano |
| 2016/0298437 | A1 | 10/2016 | Mendell |
| 2017/0174512 | A1 | 6/2017 | Oates et al. |
| 2019/0086287 | A1 | 3/2019 | Rella et al. |
| 2019/0218442 | A1 | 7/2019 | Elkatatny |
| 2019/0376374 | A1 | 12/2019 | Ayirala |
| 2020/0096663 | A1 | 3/2020 | Shetty et al. |
| 2020/0182019 | A1 | 6/2020 | Wang |
| 2020/0317513 | A1 | 10/2020 | Arkadakskiy |
| 2021/0178317 | A1 | 6/2021 | Arkadakskiy |
| 2021/0189856 | A1 | 6/2021 | Gates et al. |
| 2021/0301658 | A1 | 9/2021 | Zhang et al. |
| 2022/0065103 | A1 | 3/2022 | Rowe |
| 2022/0083048 | A1 | 3/2022 | Cella et al. |
| 2023/0050823 | A1 | 2/2023 | Darrah |
| 2023/0102312 | A1 | 3/2023 | Darrah |
| 2023/0323756 | A1 | 10/2023 | Darrah et al. |
| 2024/0426198 | A1 | 12/2024 | Templeton |

FOREIGN PATENT DOCUMENTS

| | | |
|---|---|---|
| CN | 114506817 A | 5/2022 |
| JP | S5343095 A | 4/1978 |
| JP | S63500864 A | 3/1988 |
| WO | 1987001731 A1 | 3/1987 |
| WO | 2008128331 A1 | 10/2008 |
| WO | 2011034677 A2 | 3/2011 |
| WO | 2019224326 A1 | 11/2019 |
| WO | 2021091563 A1 | 5/2021 |
| WO | 2024218543 A1 | 10/2024 |

OTHER PUBLICATIONS

McQueen, et al., "Ambient weathering of magnesium oxide for $CO_2$ removal from Air", (2020). Nature Communications, 11(1). https://doi.org/10.1038/s41467-020-16510-3.

Worman, et al., "Abiotic hydrogen (H2) sources and sinks near the Mid-Ocean Ridge (MOR) with implications for the subseafloor biosphere", (2020). Proceedings of the National Academy of Sciences, 117(24), 13283-13293. https://doi.org/10.1073/pnas.2002619117. Downloaded from https://www.pnas.org on Apr. 12, 2022.

Worman, Stacey Lynn, "Global Rates of Free Hydrogen (H2) Production by Serpentinization and other Abiogenic Processes within Young Ocean Crust", Department of Earth and Ocean Sciences Duke University, 2015.

Doveton, "Basics of Oil & Gas Log Analysis" [online], 1999 (1999) [retrieved on Jul. 24, 2023]. Retrieved from the internet: <URL:https://www.kgs.ku.edu/PRS/Info/pdf/doveton.PDF>.

International Search Report and Written Opinion dated Oct. 12, 2023 for PCT Application No. PCT/US2023/024711.

International Search Report and Written Opinion for International Application No. PCT/US2023/024721 mailed Oct. 10, 2023.

International Search Report and Written Opinion for International Application No. PCT/US2023/024723 mailed Oct. 24, 2023.

International Search Report and Written Opinion mailed Aug. 11, 2023 for PCT Application No. PCT/US2023/016610.

International Search Report and Written Opinion mailed Aug. 30, 2023 for International Application No. PCT/US2023/018331.

International Search Report and Written Opinion mailed Aug. 31, 2023 for International Application No. PCT/US2023/024719.

Invitation to Pay Additional Fees dated Aug. 14, 2023 for PCT Application No. PCT/US2023/024711.

Invitation to Pay Additional Fees for Internationa Application No. PCT/US2023/024723, mailed Aug. 22, 2023.

Invitation to Pay Additional Fees for International Application No. PCT/US2023/024721 mailed Jul. 26, 2023.

Wang, et al., "Enhanced Hydrogen Production with Carbon Storage by Olivine Alteration in CO2-Rich Hydrothermal Environments." Journal of CO2 Utilitzation, vol. 30, 20219, pp. 205-213, https://doi.org/10.1016/j.jcou.2019.02.008.

Andreani, Muriel et al.; "Aluminum Speeds Up the Hydrothermal Alteration of Olivine," American Mineralogist Issue 98, p. 1738-1744, Oct. 1, 2013 (7 pages).

Deville et al. "Natural Flows of H2 and associated Diagenetic Processes of Atmospheric CO2 Capture and sequestratin; A Study in the Ophiolites of Oman", Proceedings, 10th Offshore Mediterranean Conference and Exhibition, Ravenna, Italy, Mar. 23-25, 2011, (pp. 1-9); (Deville). (Year: 2011).

Goffe, Bruno. "Is Natural (Native) Hydrogen Only a Scientific Curiousity or Could be a Challenge for Energy," 2014 Cerege CNRS-AMU Conference, Dec. 11, 2014 (36 pages).

International Search Report issued for WO2023007467, mailed Dec. 29, 2022 (4 pages).

Osselin, Florian et al.; "Reactive Transport Experiments of Coupled Carbonation and Serpentinization in a Natural Serpentinite. Implications for Hydrogen Production and Carbon Geological Storage," Geochemica et Cosmochimica Acta, Issue 318, p. 165-189, Feb. 26, 2021 (25 pages).

Osselin, Florian; "Experimental Study of the Co-Valorization of Carbon Dioxide Storage through Hydrogen Production in Ultramafic Geological Formations," Fall 2019 American Geophysical Union Meeting abstract, Dec. 9, 2019 (1 page).

Osselin, Florian; "Experimental Study of the Co-Valorization of Carbon Dioxide Storage through Hydrogen Production in Ultramafic Geological Formations," Fall 2019 American Geophysical Union Meeting translated poster, Dec. 9, 2019 (1 page).

Osselin, Florian; "Insights from Reactive Percolation Experiments on the Geological Storage of CO2 in Natural Serpentinites," 2021 Interpore Conference presentation, Jun. 3, 2021 (18 pages).

Osselin, Florian; "Insights from Reactive Percolation Experiments on the Geological Storage of CO2 in Natural Serpentinites," 2021 Interpore Conference speakers notes, Jun. 3, 2021 (5 pages).

Osselin, Florian; "Reactive Percolation Experiments of the Coupling between Serpentinization and Carbonation in Natural Serpentinite: Implications for H2 Production and CO2 Sequestration," 2021 Natural Hydrogen: State of Research in France Conference abstract, Jun. 28, 2021 (1 page).

Osselin, Florian; "Reactive Percolation Experiments of the Coupling between Serpentinization and Carbonation in Natural Serpentinite:

(56) References Cited

OTHER PUBLICATIONS

Implications for H2 Production and CO2 Sequestration," 2021 Natural Hydrogen: State of Research in France Conference original poster, Jun. 28, 2021 (1 page).
Osselin, Florian; "Reactive Percolation Experiments of the Coupling between Serpentinization and Carbonation in Natural Serpentinite: Implications for H2 Production and CO2 Sequestration," 2021 Natural Hydrogen: State of Research in France Conference translated poster, Jun. 28, 2021 (1 page).
Osselin, Florian; "Reactive Transport Experiments of Coupled Carbonation and Serpentinization in a Natural Serpentinite. Implication for Hydrogen Production and Carbon Geological Storage," 2021 Goldschmidt Conference abstract, Jan. 1, 2021 (2 pages).
Osselin, Florian; "Reactive Transport Experiments of Coupled Carbonation and Serpentinization in a Natural Serpentinite. Implication for Hydrogen Production and Carbon Geological Storage," 2021 Goldschmidt Conference presentation, Jul. 9, 2021 (20 pages).
Osselin, Florian; "Reactive Transport Experiments of Coupled Carbonation and Serpentinization in a Natural Serpentinite. Implication for Hydrogen Production and Carbon Geological Storage," Cryspom VII Conference presentation, Jun. 3, 2020 (24 pages).
Third Party Observation dated Oct. 17, 2023 from International Patent Application PCT/IB2022/057090 (5 pages).
US Department of Energy, Office of Fossil Energy and Carbon Management Publication, entitled "Sour Gas Streams Safe for Carbon Sequestration, DOE-Sponsored Study Shows" dated Sep. 23, 2010, (pp. 1-3) (Year: 2010).
Miller, H.M., et al., "Low temperature Hydrogen Production During Experimental Hydration of Partially—Serpentnized Dunite" Science Diret, Geochimica et Cosmochimica Acta, vol. 209, (pp. 161-183) (Apr. 24, 2017).
Russell, M. J., et al., "Serpentinization as a Source of Energy at the Origin of Life," Geobiology, vol. 8, (Nov. 9, 2010) (pp. 355-371).
Verlaguet, A. et al., Fluid Circulation Along an Oceanic Detachment Fault: Insights From Fluid Inclusions in Silicified Brecciated Fault Rocks (Mid-Atlantic Ridge at 13 20'N), Geochemistry, Geophysics, Geosystems, vol. 22, No. 1 (Jan. 6, 2021) (pp. 1-32).

* cited by examiner

HYDROGEN PRODUCTION AND SULFUR-CARBON SEQUESTRATION

CROSS-REFERENCE TO RELATED APPLICATIONS

This application claims priority to U.S. Provisional Application No. 63/330,216 filed on Apr. 12, 2022, U.S. Provisional Application No. 63/330,220 filed on Apr. 12, 2022, and U.S. Provisional Application No. 63/330,223 filed on Apr. 12, 2022, the disclosures of which are incorporated herein in their entirety by this reference.

BACKGROUND

The use of hydrogen as a chemical feedstock and fuel source to replace hydrocarbons and other fossil fuels has been a long term but unobtained goal of society. This dream of a hydrogen economy has yet to be obtained primarily because of the long-standing problem in obtaining hydrogen in the amounts and at the costs needed for a viable hydrogen economy. Further, current methods of hydrogen synthesis are extremely carbon and energy intensive. Nonetheless, once formed, hydrogen provides a clean energy source that eliminates the greenhouse gases that are produced from using hydrocarbons, e.g., gas and oil, as an energy source. As a result, various mechanisms for producing low- or negative-carbon or "green" hydrogen are being considered in various industrial sectors. Hydrogen is a very important chemical that is used in various industries and can be extracted from subsurface rock formations.

Subsurface rock formations can include other materials that can be used for energy production. For example, the formations can be rich in elements such as iron or minerals and fluids. Also, the rock formations can include pores that may hold or store any of various products or fluids. Byproducts of processes can be stored or sequestered in the subsurface formation for extended time periods. For example, over the long-term, carbon dioxide can be mineralized to a solid, thus removing it from the atmosphere over geologic timescales. Sequestration can be a climate change mitigation option for near and long term scenarios.

BRIEF DESCRIPTION OF THE DRAWINGS

The drawings illustrate several embodiments of the invention, wherein identical reference numerals refer to identical or similar elements or features in different views or embodiments shown in the drawings.

SUMMARY

Figure 1:
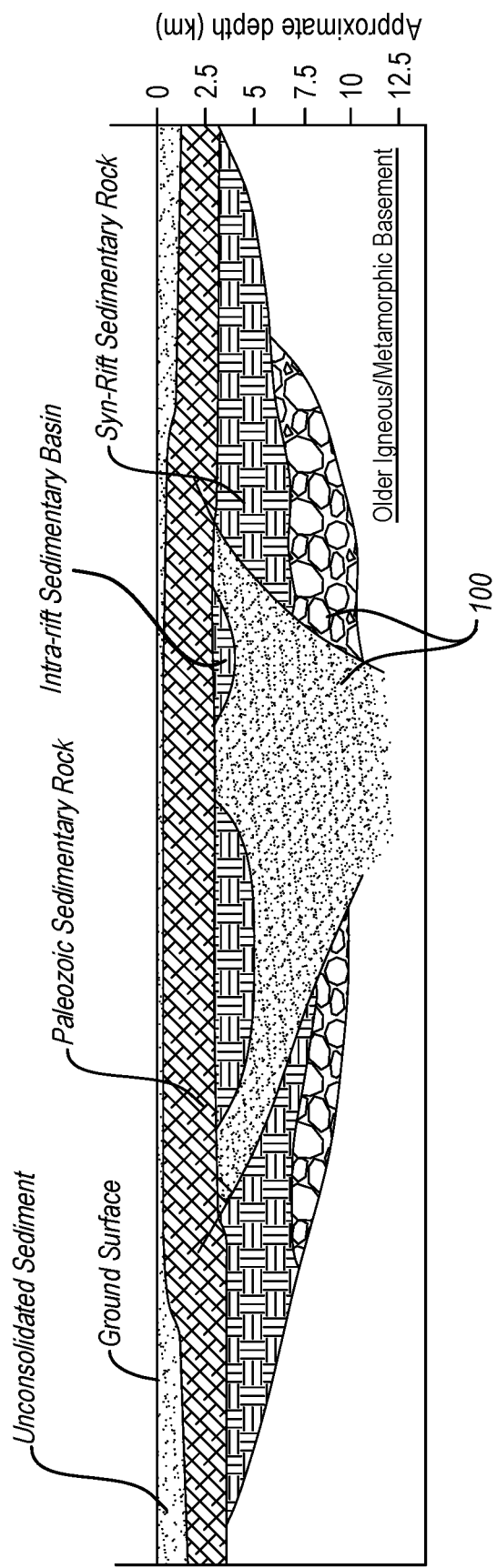
FIG. 1 illustrates a cross-section of mafic rock that can be accessed for heat assisted enhanced hydrogen production, sulfur enhanced hydrogen production, or sulfur-carbon mixture enhanced hydrogen production according to an embodiment.

Embodiments of the present disclosure relate generally to the field of energy extraction, geology, or geophysics. Some embodiments disclose methods of producing hydrogen from a subsurface rock formation. Some embodiments include sulfur sequestration by mineralization of dihydrogen sulfide, and carbon sequestration by mineralization of carbon dioxide.

In an embodiment, a method of producing hydrogen from a subsurface formation can include injecting a reactant into the subsurface formation and reacting the reactant with the subsurface formation to form at least one of hydrogen gas or a mineralized product within the subsurface formation. The method can further include collecting hydrogen produced from a reaction of the reactant with the subsurface formation or sequestering one or more components of the reactant to form mineralized sulfur or mineralized carbon. In some embodiments, the reactant can include at least one of dihydrogen sulfide, carbon dioxide, water, steam, brine, geothermal fluid, or waste heat fluid. The subsurface formation can include at least one of iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral bearing rock or sediment, partially or completely serpentinized rock, serpentinite, pyrite, iron-rich sandstone, other iron-rich sedimentary rock, or iron-rich sediments. In some examples, the subsurface formation includes a porous, faulted, or geologically or incipiently fractured rock formation. In some embodiments, the subsurface rock formation includes a natural geothermal system.

In some embodiments, the method can further include heating the reactant prior to injecting the thermal fluid into the subsurface formation. The reactant can be heated from a source external to the subsurface rock formation. In some embodiments, the method can include fracturing the subsurface formation. The reaction can include one or more of a serpentinization reaction, a pyritization reaction, or a decarbonation reaction.

In some embodiments, a method of sequestering carbon dioxide or dihydrogen sulfide in a subsurface rock formation can include injecting a fluid including at least one of carbon dioxide and dihydrogen sulfide into the subsurface rock formation and reacting the fluid with elements of the subsurface rock formation to form at least one of hydrogen gas, mineralized carbon, or mineralized sulfur. In some embodiments, the subsurface rock formation can include one or more of iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral bearing rock or sediment, partially or completely serpentinized rock, serpentinite, pyrite, iron-rich sandstone, other iron-rich sedimentary rock, or iron-rich sediments in the subsurface rock formation to form hydrogen gas and mineralize carbon from carbon dioxide. The subsurface rock formation includes a porous, faulted, geologically or incipiently fractured rock formation, or a natural geothermal system. In some embodiments, the method can further include heating the fluid prior to injecting the thermal fluid into the subsurface formation. The fluid can be heated by a heat source external to the subsurface rock formation. In some embodiments, reacting the fluid with elements of the subsurface rock formation can include one or more of a serpentinization reaction, a pyritization reaction, or a decarbonation reaction. The method can further include collecting the hydrogen gas formed by reacting the fluid with elements of the subsurface rock formation.

In some embodiments, a method of producing hydrogen from a subsurface rock formation can include injecting a thermal fluid into the subsurface rock formation. The thermal fluid can include a reactant and be heated by a heat source external to the subsurface rock formation and the reactant can include one or more of dihydrogen sulfide or carbon dioxide. The method can further include reacting the reactant with components in the subsurface formation to form at least one of hydrogen gas, mineralized sulfur or carbon, and collecting hydrogen produced from a reaction of the reactant with the subsurface formation or sequestering mineralized sulfur or carbon within the subsurface formation. In some embodiments, the subsurface rock formation can include one or more of iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral bearing rock or sediment, partially or completely serpentinized rock, serpentinite, pyrite, iron-rich sandstone, other iron-rich sedimentary rock, or iron-rich sediments. The subsurface rock formation can include a porous, faulted, geologically or incipiently fractured rock formation, or a natural geothermal system. In some embodiments, the thermal fluid includes at least one of water, steam, brine, geothermal fluid, waste heat fluid, or a super-critical fluid.

DETAILED DESCRIPTION

Embodiments of the present disclosure relate generally to the field of energy extraction, geology, or geophysics. Some embodiments disclose methods of producing hydrogen from a subsurface rock formation. The subsurface rock formation can include a porous, faulted, or geologically or incipiently fractured rock formation. More particularly, the present disclosure relates to methods for producing and extracting hydrogen in the subsurface. Other embodiments disclose methods for generation and recovery of hydrogen, sulfur sequestration by mineralization of dihydrogen sulfide, and carbon sequestration by mineralization of carbon dioxide.

FIG. 1 illustrates a cross-section of mafic rock 100 in situ that can be accessed for heat assisted enhanced hydrogen production, sulfur enhanced hydrogen production, or sulfur-carbon mixture enhanced hydrogen production according to an embodiment. In some embodiments, the production of hydrogen can be from geographies where hydrogen production was limited by a lack of key reactants (i.e., water, heat, carbon dioxide, or dihydrogen sulfide) or not possible on any economically viable manner, or sulfur and carbon mineralization were not possible on any economically viable manner. However, the methods of producing hydrogen described herein can find applicability and provide improvements and benefits to those geographies with excess geothermal heat (e.g., geothermal heat gradient is greater than 20° C./km), and others.

In some embodiments, in the production of natural resources from formations within the earth, a well or borehole can be drilled into the earth to the location where the natural resource is believed to be located. Similarly in the injection of water or the sequestration of dihydrogen sulfide, carbon dioxide, or other greenhouse gases in formations within the earth, a well or borehole is drilled into the earth to the location where water or these gases will be injected, located, and sequestered. These natural resources to be recovered may be hydrogen; helium; carbon dioxide; dihydrogen sulfide; methane or other hydrocarbon gases; a dihydrogen sulfide reservoir; a hydrogen reservoir; a helium reservoir; a carbon dioxide reservoir; a reservoir rich in dihydrogen sulfide; a reservoir rich in hydrocarbons; the natural resource may be fresh water; brackish water; brine; steam; it may be a heat source for geothermal energy; or it may be some other natural resource, ore deposit, mineral, metal, or gem that is located within the ground.

These resource-containing formations may be a few hundred feet, a few thousand feet, or tens of thousands of feet below the surface of the earth, including under the floor of a body of water, e.g., below the sea floor or beneath other natural resources, e.g., below aquifers. In addition to being at various depths within the earth, these formations may cover areas of differing sizes, shapes, and volumes.

Typically, and by way of general illustration, in drilling a well an initial borehole is made into the earth, e.g., the surface of land or seabed, and then subsequent and smaller diameter boreholes are drilled to extend the overall depth of the borehole. In this manner as the overall borehole gets deeper its diameter becomes smaller, resulting in what can be envisioned as a telescoping assembly of holes with the largest diameter hole being at the top of the borehole closest to the surface of the earth.

The starting phases of a subsea drill process may be explained in general as follows. Once the drilling rig is positioned on the surface of the water over the area where drilling is to take place, an initial borehole is made by drilling a 36" hole in the earth to a depth of about 200-300 ft. below the seafloor. A 30" casing is then inserted into this initial borehole. This 30" casing may also be called a conductor. The 30" conductor may or may not be cemented into place. During this drilling operation a riser is generally not used and the cuttings from the borehole, e.g., the earth and other material removed from the borehole by the drilling activity are returned to the seafloor. Next, a 26" diameter borehole is drilled within the 30" casing, extending the depth of the borehole to about 1,000-1,500 ft. This drilling operation may also be conducted without using a riser. A 20" casing is then inserted into the 30" conductor and 26" borehole. This 20" casing is cemented into place. The 20" casing has a wellhead secured to it. (In other operations an additional smaller diameter borehole may be drilled, and a smaller diameter casing inserted into that borehole with the wellhead being secured to that smaller diameter casing.) A BOP (blow out preventer) is then secured to a riser and lowered by the riser to the sea floor, where the BOP is secured to the wellhead. From this point forward all drilling activity in the borehole takes place through the riser and the BOP. Riserless subsea drilling operations are also contemplated.

For a land-based drilling process, the steps are similar, although the large diameter tubulars, 30"-20" are typically not used. Thus, and generally, there is a surface casing that is typically about 13⅜" diameter. This may extend from the surface, e.g., wellhead and BOP, to depths of tens of feet to hundreds of feet. One of the purposes of the surface casing is to meet environmental concerns in protecting ground water and prevent surface casing vent flow of greenhouse gases or flammable gases to groundwater aquifers or the atmosphere. The surface casing should have sufficiently large diameter to allow the drill string, production equipment such as electronic submersible pumps (ESPs) and circulation mud to pass through. Below the casing one or more different diameter intermediate casings may be used. (It is understood that sections of a borehole may not be cased, which sections are referred to as open hole.) These can have diameters in the range of about 9" to about 7", although larger and smaller sizes may be used, and can extend to depths of thousands and tens of thousands of feet. Inside of the casing and extending from a pay zone, or production zone of the borehole up to and through the wellhead on the surface is the production tubing. There may be a single production tubing or multiple production tubings in a single borehole, with each of the production tubing endings being at different depths.

Fluid communication between the formation and the well can be greatly increased by the use of hydraulic fracturing techniques. The first uses of hydraulic fracturing date back to the late 1940s and early 1950s. In general, hydraulic fracturing treatments involve forcing fluids down the well and into the formation, where the fluids enter the formation and crack, e.g., force the layers of rock to break apart or fracture. These fractures create channels or flow paths that may have cross sections of a few microns, to a few millimeters, to several millimeters in size, and potentially larger. The fractures may also extend out from the well in all directions for a few feet, several feet, and tens of feet or further. The fractures may be kept open by using a proppant (e.g., various sized sand or other mineral grains) that are forced down the well with the fracturing fluid in a single operation. It should be remembered that the longitudinal axis of the well in the reservoir may not be vertical: it may be on an angle (either sloping up or down) or it may be horizontal. The section of the well located within the reservoir, i.e., the section of the formation containing the natural resources, can be called the pay zone.

As used herein, unless specified otherwise, the terms "hydrogen exploration and production," "carbon dioxide exploration and production," "helium exploration and production," "dihydrogen sulfide exploration and production," "exploration and production activities," "E&P," and "E&P activities," and similar such terms are to be given their broadest possible meaning, and include surveying, geological analysis, well planning, reservoir planning, reservoir management, drilling a well, workover and completion activities, hydrogen production, flowing of hydrogen from a well, collection of hydrogen, secondary and tertiary recovery from a well, the management of flowing hydrogen from a well, carbon dioxide injection, carbon dioxide sequestration, carbon dioxide mineralization, dihydrogen sulfide injection, dihydrogen sulfide sequestration, dihydrogen sulfide mineralization, and any other upstream activities.

As used herein, unless specified otherwise, the terms "fluid injection" or injection of "fluid", "specifically treated or heated steam", "water", "hot water", "brine", "pressurized hot water", "gray water", "wastewater", "seawater", "geothermal fluids", "geothermal exhaust fluids", "other heated (e.g., waste heat) thermal fluids", "$CO_2$" alone, mixed with, or dissolved in or combined with specifically treated or heated steam, water, hot water, brine, pressurized hot water, gray water, wastewater, seawater, geothermal fluids, geothermal exhaust fluids, or other heated thermal (e.g., waste heat) fluids, "gaseous $CO_2$", "super-critical $CO_2$", or other heated thermal fluids, "$H_2S$" alone, mixed with, or dissolved in or combined with specifically treated or heated steam, water, hot water, brine, pressurized hot water, gray water, wastewater, seawater, geothermal fluids, geothermal exhaust fluids, or other heated thermal (e.g., waste heat) fluids, "gaseous $H_2S$", "super-critical $H_2S$", or other heated thermal fluids, and similar such terms are to be given their broadest possible meaning.

As used herein, unless specified otherwise, the term "reactant" includes any component required to cause a change in the subsurface formation including "fluid," "thermal fluid," "heat," "$CO_2$," alone, mixed with, or dissolved in or combined with specifically treated or heated steam, water, hot water, brine, pressurized hot water, gray water, wastewater, seawater, geothermal fluids, geothermal exhaust fluids, or other heated thermal (e.g., waste heat) fluids, "gaseous $CO_2$", "super critical $CO_2$", or other heated thermal fluids, "$H_2S$" alone, mixed with, or dissolved in or combined with specifically treated or heated steam, water, hot water, brine, pressurized hot water, gray water, wastewater, seawater, geothermal fluids, geothermal exhaust fluids, or other heated thermal (e.g., waste heat) fluids, "gaseous $H_2S$", "super-critical $H_2S$", or other heated thermal fluids.

As used herein, unless specified otherwise, the terms "fracturing", "stimulation", "fracking" or other such terms are to be given their broadest possible meaning.

As used herein, unless specified otherwise, the terms "sulfur mineralization," "sulfur sequestration," "sulfur mitigation," "carbon dioxide mineralization," "carbon dioxide sequestration," "carbon dioxide mitigation," "carbon mineralization," "carbon sequestration," "carbon mitigation," and similar such terms are to be given their broadest possible meaning, and include surveying, geological analysis, well planning, reservoir planning, reservoir management, drilling a well, workover and completion activities, sulfur injection, dihydrogen sulfide injection, carbon injection, carbon dioxide injection, supercritical dihydrogen sulfide injection, supercritical carbon dioxide injection, the management of flowing sulfur, dihydrogen sulfide, carbon, carbon dioxide, supercritical dihydrogen sulfide, or supercritical carbon dioxide to a well, and any other upstream activities.

As used herein, unless specified otherwise, the term "earth" should be given its broadest possible meaning, and includes, the ground, all natural materials, such as rocks, and artificial materials, such as concrete, borehole casing, piping, or fill, that are or may be found in the ground.

As used herein, unless specified otherwise "offshore" and "offshore drilling activities" and similar such terms are used in their broadest sense and would include drilling activities on, or in, any body of water, whether fresh or salt water, whether manmade or naturally occurring, such as for example rivers, lakes, canals, inland seas, oceans, seas, such as the North Sea, bays and gulfs, such as the Gulf of Mexico. As used herein, unless specified otherwise the term "offshore drilling rig" is to be given its broadest possible meaning and would include fixed towers, tenders, platforms, barges, jack-ups, floating platforms, drill ships, dynamically positioned drill ships, semi-submersibles and dynamically positioned semi-submersibles. As used herein, unless specified otherwise the term "seafloor" is to be given its broadest possible meaning and would include any surface of the earth that lies under, or is at the bottom of, any body of water, whether fresh or salt water, whether manmade or naturally occurring.

As used herein, unless specified otherwise, the term "borehole" should be given its broadest possible meaning and includes any opening that is created in the earth that is substantially longer than it is wide, such as a well, a well bore, a well hole, a micro hole, a slimhole and other terms commonly used or known in the arts to define these types of narrow long passages. Wells would further include exploratory, discovery, production, abandoned, reentered, reworked, recirculation, and injection wells. They would include both cased and uncased wells, and sections of those wells. Uncased wells, or section of wells, also are called open holes, boreholes, open boreholes, open bores, or open hole sections. Boreholes may further have segments or sections that have different orientations, they may have straight sections and arcuate sections and combinations thereof. Thus, as used herein unless expressly provided otherwise, the "bottom" of a borehole, the "bottom surface" of the borehole and similar terms refer to the end of the borehole, i.e., that portion of the borehole furthest along the path of the borehole from the borehole's opening, the surface of the earth, or the borehole's beginning. The terms "side" and "wall" of a borehole should be given their broadest possible meaning and include the longitudinal surfaces of the borehole, whether or not casing or a liner is present, as such, these terms would include the sides of an open borehole or the sides of the casing that has been positioned within a borehole. Boreholes may be made up of a single passage, multiple passages, connected passages, (e.g., branched configuration, fishbone configuration, dual lateral configuration, trilateral configuration, quadrilateral configuration, pitchfork configuration, pinnate configuration, or comb configuration), and combinations and variations thereof.

Boreholes are generally formed and advanced by using mechanical drilling equipment having a rotating drilling tool, e.g., a bit. For example, and in general, when creating a borehole in the earth, a drilling bit is extending to and into the earth and rotated to create a hole in the earth. To perform the drilling operation the bit must be forced against the material to be removed with a sufficient force to exceed the shear strength, compressive strength, or combinations thereof, of that material. The material that is cut from the earth is generally known as cuttings or drill cuttings, e.g., waste, which may be chips of rock, dust, rock fibers, and other types of materials and structures that may be created by the bit's interactions with the earth. These cuttings are typically removed from the borehole by the use of fluids, which fluids can be liquids, foams or gases, or other materials known to the art.

As used herein, unless specified otherwise, the term "drill pipe" is to be given its broadest possible meaning and includes all forms of pipe and collars used for drilling activities; and refers to a single section or piece of pipe or collar. As used herein the terms "stand of drill pipe," "drill pipe stand," "stand of pipe," "stand," and similar type terms should be given their broadest possible meaning and include two, three, or four sections of drill pipe that have been connected, e.g., joined together, typically by joints having threaded connections. As used herein the terms "drill string," "string," "string of drill pipe," string of pipe," and similar type terms should be given their broadest definition and would include a stand or stands joined together for the purpose of being employed in a borehole. Thus, a drill string could include many stands and many hundreds of sections of drill pipe.

As used herein, unless specified otherwise, the terms "subsurface formation," "rock formation," "formation," "reservoir," "pay zone," and similar terms, are to be given their broadest possible meanings and would include all locations, areas, and geological features within the earth that contain, may contain, or are believed to contain, iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral bearing rock or sediment, partially or completely serpentinized rock, serpentinite, pyrite, iron-rich sandstone, other iron-rich sedimentary rock, or iron-rich sediments, hydrogen, carbon dioxide, helium, or dihydrogen sulfide.

As used herein, unless specified otherwise, the terms "field," "oil field," "gas field," and similar terms, are to be given their broadest possible meanings, and would include any area of land, sea floor, or water that is loosely or directly associated with a geologic formation, and more particularly with a resource-containing formation. Thus, a field may have one or more exploratory and producing wells associated with it, a field may have one or more governmental body or private resource leases associated with it, and one or more field(s) may be directly associated with a resource-containing formation.

As used herein, unless specified otherwise, the terms "conventional hydrogen," "conventional carbon dioxide," "conventional helium," "conventional dihydrogen sulfide," "conventional natural gas," "conventional," "conventional production," and similar such terms are to be given their broadest possible meaning and include hydrogen, carbon dioxide, helium, dihydrogen sulfide, or natural gas that are trapped in structures in the earth. Generally, in these conventional formations the hydrogen, carbon dioxide, helium, dihydrogen sulfide, or natural gas have migrated in permeable, semi-permeable, or fractured formations to a trap, or area where they are accumulated. Typically, in conventional formations, a non-porous, relatively impermeable layer is above, or encompassing the area of accumulated hydrogen, carbon dioxide, helium, dihydrogen sulfide, or natural gas in essence trapping the hydrogen, carbon dioxide, helium, dihydrogen sulfide, or natural gas in the accumulation. Conventional reservoirs have been historically the sources of the vast majority of hydrogen, carbon dioxide, helium, and dihydrogen sulfide observed. As used herein, unless specified otherwise, the terms "unconventional hydrogen," "unconventional carbon dioxide," "unconventional helium," "unconventional dihydrogen sulfide," "unconventional natural gas," "unconventional," "unconventional production," and similar such terms are to be given their broadest possible meaning and includes hydrogen, carbon dioxide, helium, dihydrogen sulfide, or natural gas that are held in iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral bearing rock or sediment, partially or completely serpentinized rock, serpentinite, pyrite, iron-rich sandstone, other iron-rich sedimentary rock, or iron-rich sediments, low porosity rock, low permeability rock, or impermeable rock, or which have not migrated to traps or areas of accumulation.

As used herein, unless specifically stated otherwise, the term "gold hydrogen" should be given its broadest possible meaning, and generally refers to hydrogen produced from the subsurface by drilling or by drilling and stimulating iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral bearing rock or sediment, partially or completely serpentinized rock, serpentinite, pyrite, iron-rich sandstone, other iron-rich sedimentary rock, or iron-rich sediments, uranium- and thorium-rich igneous or metamorphic rocks (e.g., granite and granitic gneisses), or uranium- and thorium-rich sediments or sedimentary rock with or without fracturing or other forms of mechanical stimulation that can provide an abundant source of low or negative carbon emission, low cost, fully dispatchable energy.

As used herein, unless specifically stated otherwise, the term "element" should be given its broadest possible meaning, and generally refers to each of more than one hundred chemical substances that cannot be chemically interconverted or broken down into simpler substances and are primary constituents of matter, each which can be distinguished by its atomic number. i.e., the number of protons in the nuclei of its atoms.

As used herein, unless specifically stated otherwise, the terms "molecule" should be given their broadest possible meaning, and generally refers to a group of atoms bonded together, representing the smallest fundamental unit of a chemical compound that can take part in a chemical reaction.

As used herein, unless specifically stated otherwise, the term "measurement" should be given its broadest possible meaning, and generally refers to the act of measuring something. Examples of geochemical measurements for elements, molecules, isotopes, and isotope ratios described above can be performed with various chemical instruments, including chromatography, mass spectrometry, spectroscopy, or other methods.

As used herein, unless specifically stated otherwise, the term "chemical instrument" should be given its broadest possible meaning, and generally refers to a device or tool used for scientific purposes, included the study of natural, laboratory-based, and theoretical purposes.

As used herein, unless stated otherwise, room temperature is 25° C. And, standard temperature and pressure is 25° C. and 1 atmosphere.

Generally, the term "about" as used herein unless specified otherwise is meant to encompass a variance or range of ±10%, the experimental or instrument error associated with obtaining the stated value, and preferably the larger of these.

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

The term "$CO_2e$" is used to define carbon dioxide equivalence of other, more potent greenhouse gases, to carbon dioxide (i.e., methane and nitrous oxide) on a global warming potential basis of 100 years, based on IPCC AR5 methodology. The term "carbon intensity" is taken to mean the lifecycle $CO_2e$ generated per unit mass of a product.

$CO_2$ is widely recognized as a greenhouse gas, and the continued accumulation of $CO_2$ and other greenhouse gases in the atmosphere is expected to cause problematic changes to global ecosystems and contribute to myriad other problems, such as ocean acidification and sea level rise. The two primary causes of carbon emissions globally are the use of fossil fuels for power generation and transportation.

Given the risks of $CO_2$ emissions, significant work has gone into finding replacements to existing high carbon energy sources, or ways to decarbonize existing energy sources. However, many of these low carbon alternatives have been uneconomic or not dispatchable enough to replace the current options.

The term "sulfur equivalents" or "$SO_x$" is used to define dihydrogen sulfide or sulfur dioxide offset equivalence of sulfur emissions. The term "sulfur intensity" is taken to mean the lifecycle of $SO_x$ generated per unit mass of a product.

Sulfur, in various forms, including but not limited to dihydrogen sulfide, sulfur dioxide, sulfuric acid, and sulfate, is widely recognized as a toxic and harmful atmospheric and aqueous pollutant and the deposition of sulfur in soil, waterways, and other environments is expected to cause problematic changes to global ecosystems and contribute to myriad of other problems, such as acid rain, soil acidification, deforestation, ocean acidification, and other toxic impacts. The primary causes of dihydrogen sulfide emissions globally are related to petroleum and natural gas extraction and refining, pulp and paper manufacturing, rayon textile production, waste disposal, landfills, water and sewage treatment facilities, and general waste disposal. Additionally, natural factors such as volcanoes, hot springs, thermal vents, geysers, fumaroles, "sour" natural gas fields, biodegraded oil fields, and geothermal power plants also constitute major naturally occurring sources of dihydrogen sulfide and carbon dioxide.

Given the risks of dihydrogen sulfide and other forms of sulfur emissions, significant work has gone into sulfur removal technologies, the development of low sulfur fuels, or ways to desulfurize existing energy sources and processes. However, many of these low sulfur alternatives themselves create cost prohibitions, are uneconomic, or limit the dispatchability of energy sources.

Based on the risks of sulfur emissions, the U.S. EPA (IRC 45H) has created a cap-and-trade sulfur credit program for offset, sulfur abatement, and sequestration. The U.S. IRS 45Q tax credit program is a similar tax credit program for carbon dioxide sequestration.

In power generation, the alternatives to the highly reliable, low cost, but high emission sources (gas and coal) are either dispatchable and expensive (e.g., nuclear, hydroelectric, green hydrogen, or blue hydrogen), or inexpensive and intermittent (e.g., solar and wind, green hydrogen in some cases). There is only one existing source that is both lower cost and dispatchable, and that is geothermal. However, geothermal resources are limited geographically and by scale, and many of the economically productive geothermal resources have already been developed and are nearing end of life, and many geothermal resources are already in decline. As such, the growth outlook for geothermal energy resources is limited without significant technical advances.

Green hydrogen (hydrogen produced from water without the utilization of fossil fuels), which is generated by electrolysis powered from either solar, wind, hydroelectric, or geothermal energy can be a reliable source of low carbon energy when coupled with storage, but high capital cost, intermittent production due to intermittent energy sources or high cost of energy when grid connected, and the high cost and low availability of suitable hydrogen storage resources limits applicability. In addition, electrolysis consumes significantly more energy to produce the hydrogen than what is stored in the hydrogen, resulting in a low round trip efficiency in the system.

Blue hydrogen faces a similar set of problems to green hydrogen: it takes a low cost, high emission fuel source like coal or natural gas, and by adding expensive and parasitic carbon capture facilities, converts this low-cost-high-emission source of energy into a high-cost-low-emission source. Thus, even though large volumes of hydrogen can be formed in processes that subsequently prevent greenhouse gas emissions from reaching the atmosphere, the newly developed hydrogen resource is not cost competitive with other forms of energy derived from fossil fuels. Additionally, the challenges around finding carbon sequestration resources that can be used to permanently store the captured carbon from these processes result in limited opportunities to deploy these technologies today.

Natural hydrogen (or "gold hydrogen"), produced from the subsurface by drilling or by drilling and stimulating iron-rich rock, mafic rock, metamorphosed or hydrothermally altered mafic rock, pyrite, iron-rich sandstone, olivine- or pyroxene-bearing igneous rock, olivine- or pyroxene-bearing sediment or sedimentary rock, olivine- or pyroxene-bearing metamorphic rock, or iron-rich sediments, uranium- and thorium-rich igneous or metamorphic rocks (e.g., granite and granitic gneisses), or uranium- and thorium-rich sediments or sedimentary rock with or without fracturing or other forms of mechanical stimulation can provide an abundant source of low emission, low cost, fully dispatchable energy.

Each of these energy sources and their inherent advantages and limitations are also relevant to transportation. When considering transportation fuels, by far the major sources of fuel are diesel and gasoline, both derived from crude oil production. Additionally, in recent years, electric vehicles have been gaining market share, but the cost for electric vehicles is still more expensive than fossil fueled equivalents and limitations exist regarding cost, recharge time, and primary resources for battery and energy storage. Given the weight of batteries, electric long-haul trucking is also challenging, and most long-haul truck manufacturers are in search of affordable, low or negative-carbon options such as hydrogen-fueled trucking.

Natural hydrogen produced by various enhanced hydrogen production reactions would be an answer to the low or negative-carbon, low cost, reliable transportation problem for long-haul trucking and potentially other forms of transportation. As for other types of transportation, natural hydrogen as a compressed or liquified product, or as a feedstock for synthetic liquid fuel ("efuels"), would be a reliable low cost, low- or negative-carbon solution. Additionally, natural hydrogen could be combined with nitrogen to produce a carbon free ammonia product, which is being widely discussed as a potential replacement for bunker fuel for shipping and as a feedstock for synthetic fertilizer manufacturing.

Direct Emissions Reduction: Because there are no direct $CO_2$ emissions from the combustion or typical use of hydrogen, the reduction in $CO_2$ emissions is a function of what the hydrogen is replacing. In many cases, low- or negative-carbon hydrogen would be replacing hydrogen from steam methane reformation (SMR) as a chemical feedstock for ammonia production, oil refining, and other chemical manufacturing. In some cases, low or negative-carbon hydrogen may replace natural gas, diesel fuel, gasoline, or jet fuel as a heat source or transportation fuel.

In the case of ammonia production and refining, natural gas is used to produce hydrogen via steam methane reformation (SMR) reactions, which is used as a chemical feedstock in both the refining process and the ammonia production process. Today, more than 95% of hydrogen is produced using natural gas in steam methane reformers (SMRs). The carbon intensity of hydrogen production using SMRs without carbon capture is 10.4 tonnes of $CO_2$ emitted for each tonne of hydrogen produced. As such, direct replacement of natural hydrogen for hydrogen manufactured by SMR processes results in a $CO_2$ reduction of 10.4 tonnes $CO_2$/tonne $H_2$.

In power generation with gas turbines, hydrogen must displace the energy (btu) equivalent of natural gas. The energy density of hydrogen is 290 btu/cf or 51,682 btu/lb. By comparison, the energy density of natural gas is 983 btu/cf or 20,267 btu/lb, while the carbon intensity of natural gas is 52.91 kg $CO_2$/mmbtu $CH_4$ or 54.87 kg $CO_2$/mcf $CH_4$, or 3.5 kg $CO_2$/kg $CH_4$.

Because hydrogen is 2.6 times more energy dense per unit mass than natural gas, only 40% of the gross tonnage of fuel is required to achieve the same energy output. As such, burning one tonne of $H_2$ for power generation reduces natural gas consumption by ~2.6 tonnes, and thus $CO_2$ emissions by 9.1 tonnes.

Comparing natural hydrogen produced by enhanced hydrogen production reactions to hydrogen produced by electrolysis, the carbon reduction is a function of the carbon intensity of the power used in the electrolysis process. There are no direct emissions in the electrolysis process, but there may be large indirect emissions associated. However, natural hydrogen produced by enhanced hydrogen production reactions directly sequesters sulfur emissions and when enabled in combination with carbon dioxide directly sequesters carbon dioxide permanently in mineral form. As a result, there is a direct emissions reduction for sulfur or both sulfur and carbon dioxide as part of various enhanced hydrogen production processes. With respect to carbon dioxide in instances where $H_2S$ and $CO_2$ are involved in the enhanced hydrogen production process, there is a direct emissions reduction of ~10 tonnes of $CO_2$ emitted for each tonne of hydrogen produced, as compared to electrolytically produced hydrogen (or other forms of hydrogen generation). Integration of this process achieves net carbon negative hydrogen production.

Indirect Emissions Reduction: An analysis of the lifecycle carbon intensity of natural hydrogen using the Oil Production Greenhouse Gas Emissions Estimator ("OPGEE") has shown the lifecycle carbon intensity of natural hydrogen to be in the range of 0.1 to 0.4 tonnes $CO_2$/tonne $H_2$ with an additional emissions reduction equivalent to the mass of carbon dioxide mineralized by Heat Assisted Enhanced Hydrogen Production ("HAEHP") while additional carbon can be mineralized along with sulfur by the SCMEHP process. Similar studies are not available for other methods of hydrogen production. However, using an average grid intensity of 0.5 tonnes $CO_2$/MWh, and given that electrolysis requires approximately 50 MWh/tonne $H_2$ produced, the indirect emissions associated with electrolysis are about 25 tonnes $CO_2$/tonne $H_2$ produced assuming grid power. Of course, electrolysis unit operators can purchase Renewable Energy Credits to synthetically reduce the carbon footprint of their power usage, but market recognition of this as a method for eliminating real time carbon emissions may not be permanent.

The realization of abundant natural hydrogen can achieve significant reductions in equivalent carbon emissions.

Embodiments herein generally relate to producing hydrogen by injecting gaseous, liquid, or super-critical $CO_2$, $H_2S$, heated water, or a combination thereof in one or more of specifically treated steam, water, hot water, brine, pressurized hot water, gray water, wastewater, seawater, geothermal fluids, geothermal exhaust fluids, or other heated thermal (e.g., waste heat) fluids into subsurface geological formations. The heated fluid is heated by various means at the surface prior to injection or in the subsurface prior to, during or after injection into subsurface geological formation of iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral bearing rock or sediment, partially or completely serpentinized rock, serpentinite, pyrite, iron-rich sandstone, other iron-rich sedimentary rock, or iron-rich sediments. Fluid injection may be carried out with or without fracturing or other forms of mechanical stimulation of the subsurface geological formation. Although in some embodiments treatment may be applied to the subsurface geological formation via fracturing, acid treatment, or stimulation to increase porosity and permeability of iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral bearing rock or sediment, partially or completely serpentinized rock, serpentinite, pyrite, iron-rich sandstone, other iron-rich sedimentary rock, or iron-rich sediments.

In some embodiments, hydrogen can be produced by injecting at least one reactant into the subsurface formation. The reactant can include at least one of dihydrogen sulfide ($H_2S$) for Sulfur Enhanced Hydrogen Production ("SEHP"), or mixtures of dihydrogen sulfide ($H_2S$) and carbon dioxide ($CO_2$) for Sulfur-Carbon Mixture Enhanced Hydrogen Production ("SCMEHP"), or specifically treated or heated steam, water, hot water, brine, pressurized hot water, gray water, wastewater, seawater, geothermal fluids, geothermal exhaust fluids, or other heated thermal (e.g., waste heat) fluids combined with dihydrogen sulfide or mixtures of dihydrogen sulfide and carbon dioxide, either as dihydrogen sulfide or mixtures of dihydrogen sulfide and carbon dioxide dissolved in or combined with specifically treated or heated steam, water, hot water, brine, pressurized hot water, gray water, wastewater, seawater, geothermal fluids, geothermal exhaust fluids, or other heated thermal (e.g., waste heat) fluids. Hydrogen generation can be observed at $CO_2/H_2S$ ratios ranging from ~10:1 to ~50:1 (10-50 parts $CO_2$ per one part of $H_2S$) with a peak of hydrogen generation around 35:1, although other concentrations and ratios of $CO_2/H_2S$ are envisioned.

Furt
her embodiments of the production of hydrogen can relate to the injection of a thermal fluid into a subsurface rock formation. The thermal fluid can include thermal, heated, or otherwise temperature-controlled fluids (e.g., specifically treated or heated steam, water, hot water, brine, pressurized hot water, gray water, wastewater, seawater, geothermal fluids, geothermal exhaust fluids, or other heated thermal (e.g., waste heat fluids) in various forms. The hydrogen production can be termed Heat Assisted Enhanced Hydrogen Production ("HAEHP"). The thermal fluid can be formed at the surface prior to injection or below the surface prior to, during, or after injection into a geological formation or system. The heat for the fluid that is heated (or otherwise temperature controlled) can be provided by various means at the surface prior to injection or in the subsurface prior to, during, or after injection into a geological formation or system. The embodiments disclosed herein can be applied in settings with naturally occurring geothermal gradients (i.e., geothermal systems). Embodiments provide systems and methods that, among other benefits, significantly increase the resources that can be recovered by various forms of subsurface hydrogen production systems or in natural geothermal systems and significantly increase the economic drivers for sulfur and carbon mineralization in the subsurface. In this embodiment, $H_2S$, $CO_2$, or mixtures thereof, alone or when dissolved in or combined with specifically treated or heated steam, water, hot water, brine, pressurized hot water, gray water, wastewater, seawater, geothermal fluids, geothermal exhaust fluids, or other heated thermal (e.g., waste heat) fluids, can be injected into porous, faulted, or geologically or incipiently fractured iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral bearing rock or sediment, partially or completely serpentinized rock, serpentinite, pyrite, iron-rich sandstone, other iron-rich sedimentary rock, or iron-rich sediments with or without fracturing.

In some embodiments, water or dihydrogen sulfide present as a reactant in the thermal fluid can react with minerals in the rock to produce hydrogen and heat based on the exothermic nature of the reaction. In some embodiments, carbon dioxide present in the thermal fluid that is injected can react with minerals in the subsurface rock formation to produce carbon minerals and sequester carbon dioxide, mineralized sulfur, and mineralized carbon. In other embodiments, a temperature-controlled fluid can be injected into porous, faulted, or geologically or incipiently fractured subsurface formation with or without fracturing in combination with other forms of mechanical stimulation or other forms of enhanced hydrogen production (e.g., SEHP or SCMEHP).

In some embodiments, water or dihydrogen sulfide present in the injected fluid can react with minerals in the rock to produce hydrogen and produce heat based on the exothermic nature of the reaction. Carbon dioxide present in the injected fluid can react with minerals in the rock to produce carbon minerals and also sequester carbon dioxide.

The embodiments disclosed herein can be applied in settings with naturally occurring geothermal gradients (e.g., geothermal systems) and systems that are heated by other forms of topside or subsurface integration. In some embodiments, the method of producing hydrogen from a subsurface formation can expand the capacity to generate low- or negative-carbon hydrogen in the subsurface from limited geographies to regions where subsurface formations are present in the crust at sufficient depths but no excess geothermal heat is present.

Further
, the techniques and systems disclosed herein define the kinetic rates of hydrogen generation in the subsurface. SEHP and SCMEHP can include direct hydrogen production following pyritization reactions. Further, the reactions can increase porosity following fluid-rock interactions (e.g., mineralization of pyrite following iron-rich mineral interactions with dihydrogen sulfide or mineralization of pyrite and/or other sulfide mineral species and/or magnesite and other carbonate mineral species following iron- and magnesium-rich mineral (e.g., olivine and pyroxene) interactions either with dihydrogen sulfide or a combination of dihydrogen sulfide and carbon dioxide), which increases the surface area and volume for the reaction and maximizes the delivery of reactants to the subsurface and recovery of fluids from the subsurface.

In some embodiments, SEHP and SCMEHP can increase permeability following fluid-rock interactions and also catalyze subsurface exothermic reactions (e.g., pyritization and decarbonation/serpentinization reactions), which provides additional heat to increase the kinetic rates of hydrogen generation, sulfur and carbon mineralization, and combinations and variations of these.

In some embodiments, HAEHP can direct hydrogen production following serpentinization or pyritization reactions that benefit from increased temperatures in targeted subsurface reservoirs following the injection of thermal, heated, or otherwise temperature-controlled fluids.

In some embodiments, maintaining the selected temperature or temperature range (e.g., 25° C. to 500° C.) can expedite the kinetic rates of the target reactions (e.g., serpentinization and decarbonation) and suppress follow-on reactions (e.g., Sabatier reactions) that would otherwise consume newly generated hydrogen. Targeted delivery of these treated fluids to specific lithologies, geologic structures (e.g., faults, folds), and other subsurface deformation features (e.g., existing and incipient fracture networks) further increases the volumes of hydrogen generation, drives the chemical reaction toward thermodynamic equilibrium, and maximizes the potential to control porosity and permeability.

The embodiments herein provide low-carbon (in the case of either SEHP or HAEHP) and negative-carbon (in the case of SCMEHP or HAEHP involving carbon dioxide in some form) hydrogen production that utilize different injectate fluids external to the geological system, injectate fluids heated from sources external to the geological system, or a combination thereof and rely on the serpentinization (Table 1), decarbonation (Table 2), or pyritization reactions (Table 3) described below.

Figure 2:
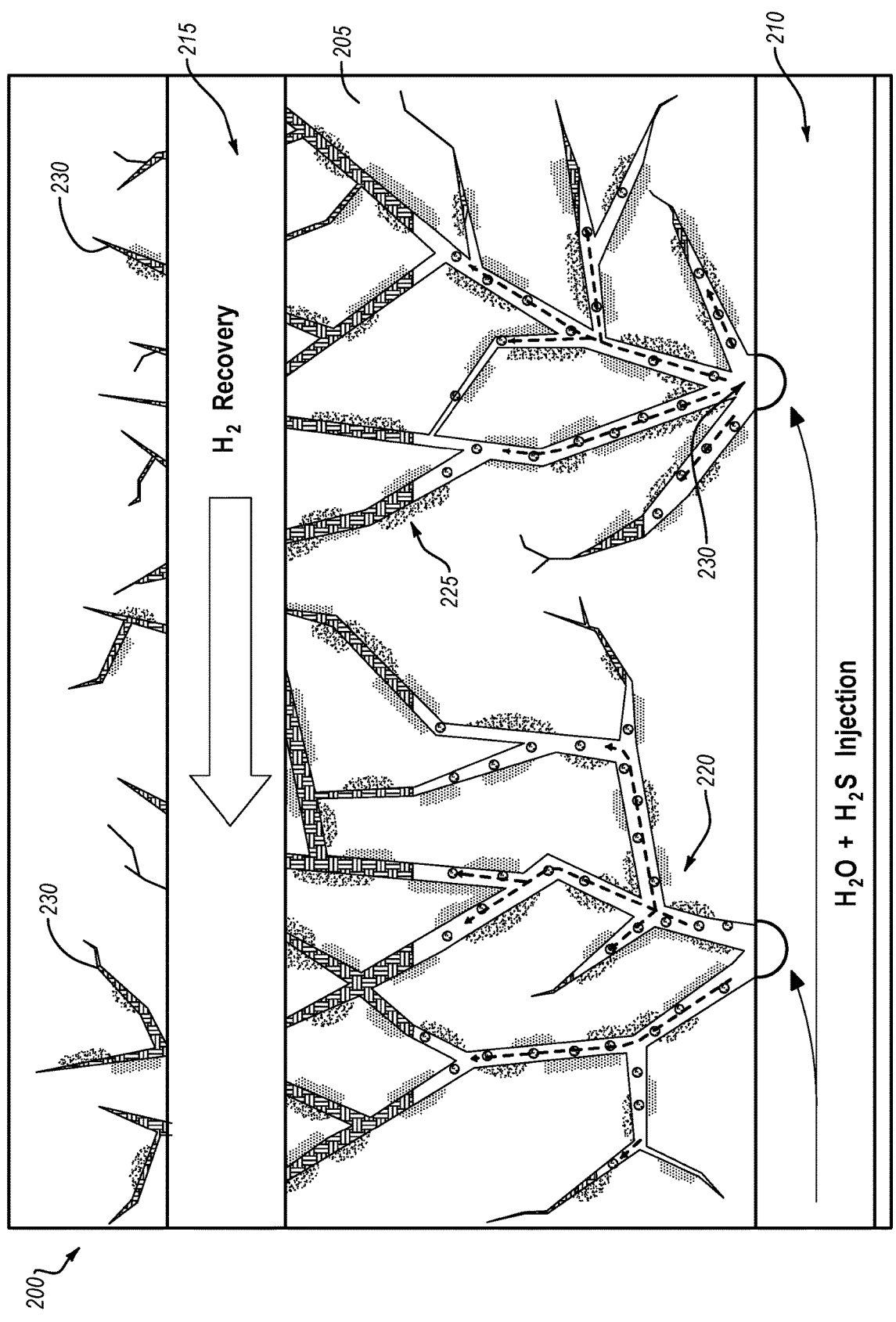
FIG. 2 is a schematic illustration of sulfur enhanced hydrogen production in a subsurface formation, according to an embodiment.

SEHP utilizes dihydrogen sulfide as an injectate. FIG. 2 is a schematic illustration of sulfur enhanced hydrogen production 200 in a subsurface formation, according to an embodiment. The pyritization reactions use iron-rich mineral phases in mafic igneous subsurface rock formation 205 (e.g., olivine and pyroxene), as well as minor perovskite mineral phases, as a catalyst for sulfide reduction to pyrite mineral phases and the production of hydrogen ($H_2$) gas. An embodiment of SEHP 200 includes utilizing the same process of injecting dihydrogen sulfide to react with the iron-rich olivine, orthopyroxene, perovskite, or other iron-rich mineral and iron-rich rock phases by also injecting heat and water from a source external into the geological system with an injection well 210 either before, during (mixed fluids), or after dihydrogen sulfide was injected into the geologic system. The hydrogen gas can be recovered from recovery well 215. Within the subsurface rock formation 205 the serpentinization reaction occurs in region 220 and pyritization reactions are shown in region 225. The reaction can occur in natural or induced fractures 230 throughout the subsurface formation 205.

Figure 3:
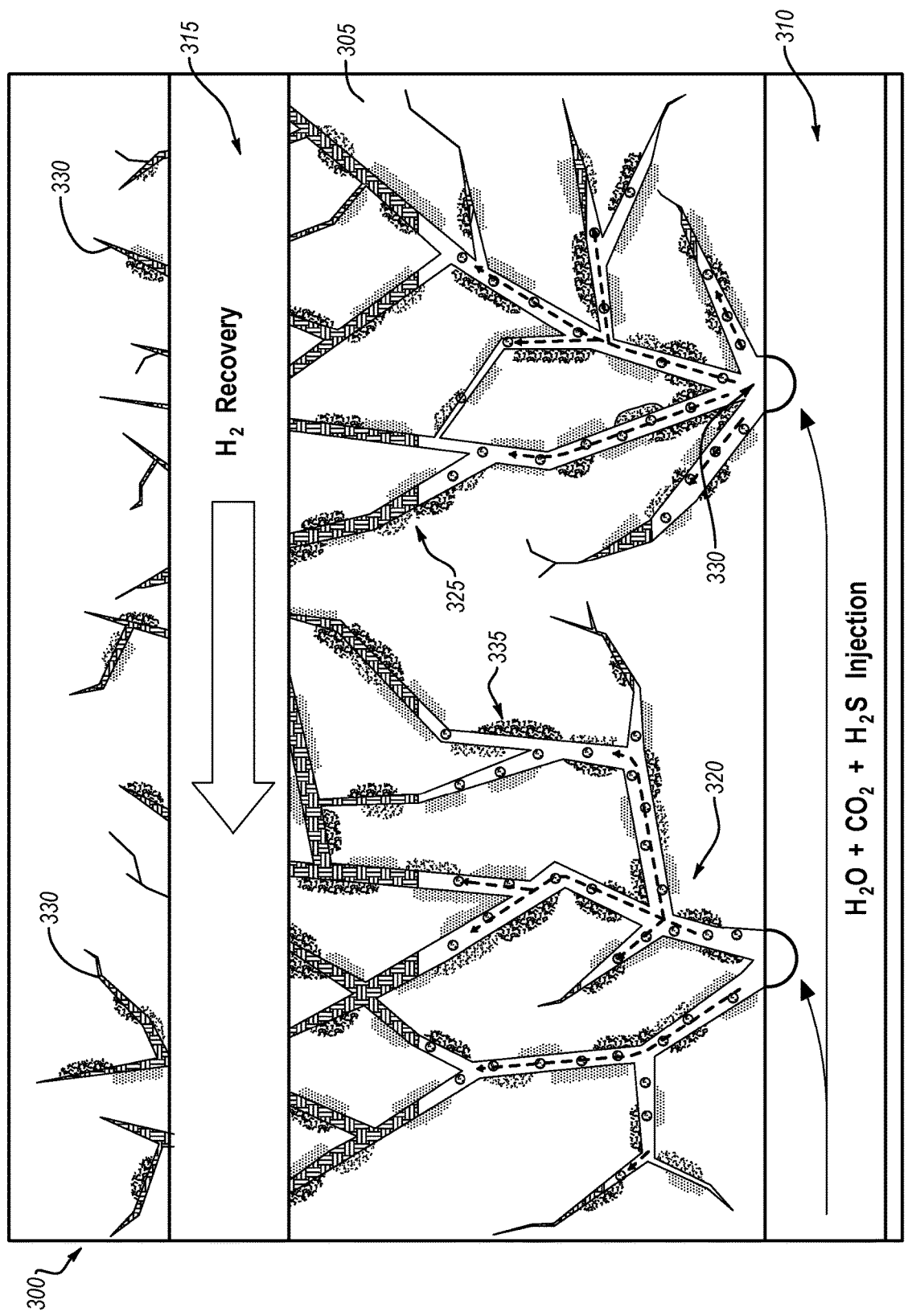
FIG. 3 is a schematic illustration of sulfur-carbon mixture enhanced hydrogen production in a subsurface formation, according to an embodiment.

SCMEHP utilizes various mixtures of dihydrogen sulfide and carbon dioxide as an injectate. FIG. 3 is a schematic illustration of sulfur-carbon mixture enhanced hydrogen production 300 in a subsurface formation 305, according to an embodiment. The pyritization and serpentinization/decarbonation reactions use the iron-rich mineral phases (e.g., olivine and pyroxene), as well as minor perovskite mineral phases, as a catalyst for sulfide reduction to pyrite mineral phases, carbon dioxide reduction to carbonate minerals, and the production of hydrogen ($H_2$) gas. The hydrogen gas can be recovered from recovery well 315. Within the subsurface rock formation 305 the serpentinization reaction occurs in region 320 and pyritization reactions are shown in region 325. Further, a $CO_2$ reduction to carbonate minerals occurs as shown in region 335. The reactions can occur in natural or induced fractures 330 throughout the subsurface formation 305. An embodiment of SCMEHP 300 includes utilizing the same process of injecting dihydrogen sulfide mixtures with carbon dioxide to react with the iron-rich olivine, orthopyroxene, perovskite, or other iron-rich mineral and iron-rich rock phases by also injecting heat from a source external into the geological system either before, during (mixed fluids), or after dihydrogen sulfide, carbon dioxide, or dihydrogen sulfide mixtures with carbon dioxide were injected into the geologic system through injection well 310.

Figure 4:
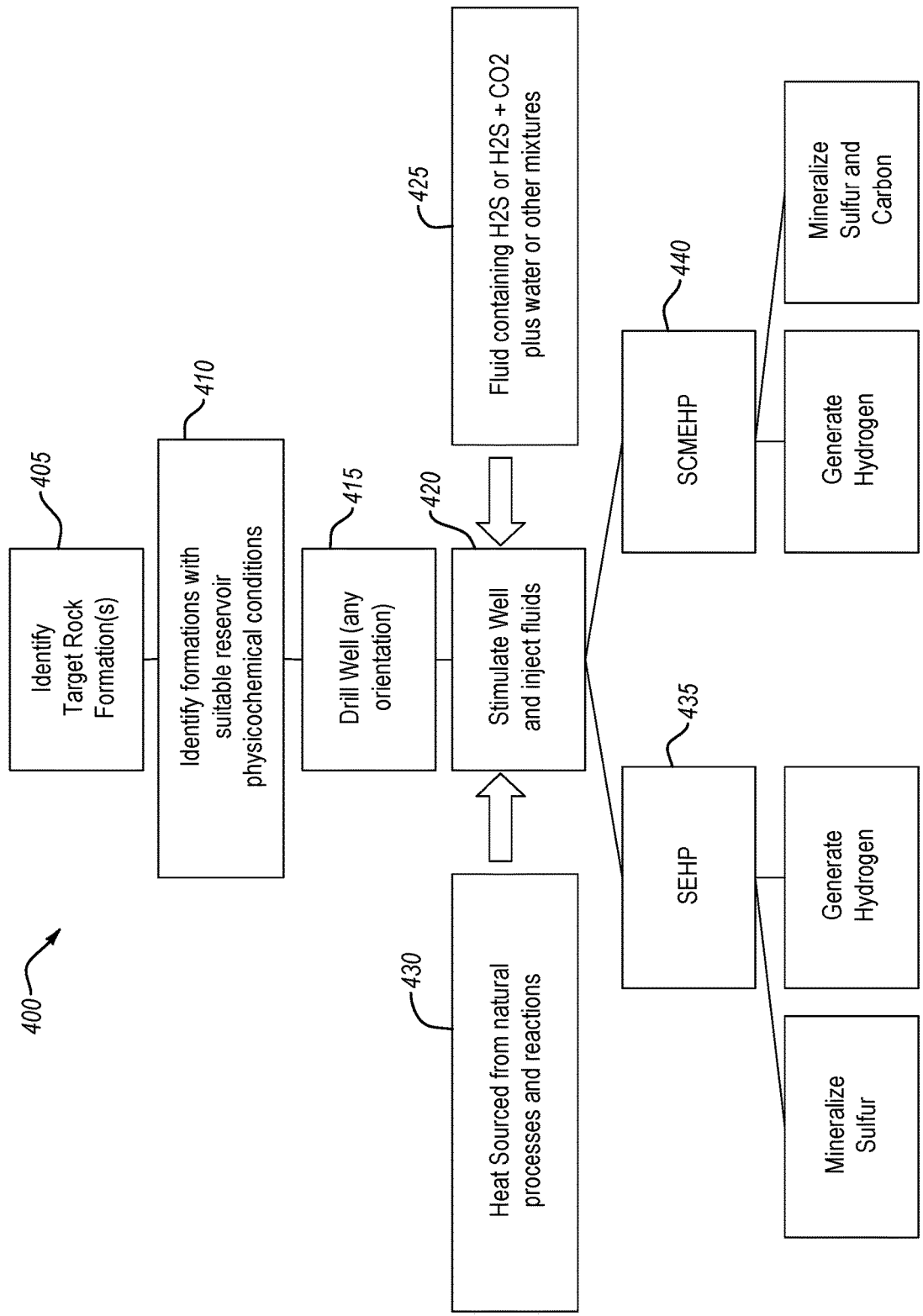
FIG. 4 is a flow chart of methods for performing sulfur enhanced hydrogen production and sulfur-carbon mixture enhanced hydrogen production, according to an embodiment.

FIG. 4 shows a flow chart 400 of methods for performing sulfur enhanced hydrogen production and sulfur-carbon mixture enhanced hydrogen production, according to an embodiment. As shown, act 405 can include target rock formations may be identified. The target rock formation may be evaluated in act 410 for rock/mineral types and a thermal fluid and/or reactant (e.g., dihydrogen sulfide, water, carbon dioxide) may be formulated according to the rock/mineral types in the target rock formation. As shown in act 415, a well may be drilled or an existing well used to deliver the stimulation fluid to the target rock formation. The rock/minerals in the rock formation may be stimulated in act 420 by injecting heated stimulation fluid into the well as shown in act 425 or by injecting heat into the well prior to, during, or after the injection of stimulation fluid. The heat for the heated stimulation fluid may be provided by equipment located on the surface (e.g., topside) or in the well. The heat is provided, at least in part, by sources external to the geological formation. In some embodiments, as shown in act 430, the heat can be sourced from natural processes and reactions.

Depending upon the composition of the fluid injected into the subsurface rock formation, one or more of SEHP or SCMEHP is carried out in situ in the target rock formation. As shown in act 435, SEHP generates hydrogen and mineralizes sulfur in the rock formation. As shown in act 440, SCMEHP generates hydrogen and mineralizes both sulfur from dihydrogen sulfide and carbon from carbon dioxide in the rock formation. Accordingly, hydrogen is produced and one or more of sulfur, carbon, or other injectates may be sequestered.

In embodiments of both techniques, the pyritization reactions can independently produce hydrogen when dihydrogen sulfide gas or supercritical dihydrogen sulfide is injected into porous, faulted, or geologically or incipiently fractured iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral bearing rock or sediment, partially or completely serpentinized rock, serpentinite, pyrite, iron-rich sandstone, other iron-rich sedimentary rock, or iron-rich sediments with elevated ambient temperature conditions, i.e., geothermal systems with temperatures ranging from 25-500° C., depending on the mineralogy, pore size, fracture intensity, pore fluid composition, and purity of gas injectate.

In some examples, the pyritization can result in recovery of hydrogen and the potential to sequester, by mineralization, sulfur from natural (e.g., geothermal systems) or various anthropogenic sources (SEHP 435) or sulfur and carbon dioxide from natural (e.g., geothermal systems) or various anthropogenic sources (SCMEHP 440).

TABLE 1

Serpentinization Reactions

| Mineral | Mineral Phase | Reaction | Moles of Igneous Mtrls | Moles of $H_2$ Generated |
|---|---|---|---|---|
| Olivine | Fayalite | $3Fe_2SiO_4 + 2H_2O \xrightarrow{yields} 2Fe_3O_4 + 3SiO_2 + 2H_2$ | 3 | 2 |
| Pyroxene | Ferrosilite | $3Fe_2Si_2O_6 + 2H_2O \xrightarrow{yields} 2Fe_3O_4 + 6SiO_2 + 2H_2$ | 3 | 2 |

In some embodiments, a temperature range for the pyritization and decarbonation/serpentinization reactions is between about 25° C. to about 500° C. It being understood that the temperature can be greater than about 100° C., greater than about 120° C., greater than about 150° C., less than about 500° C., less than about 400° C., from about 90° C. to about 500° C., from about 150° C. to about 250° C., and all temperatures with these values as well as higher and lower temperatures. Depending on the depth, geothermal gradient conditions of the iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral bearing rock or sediment, partially or completely serpentinized rock, serpentinite, pyrite, iron-rich sandstone, other iron-rich sedimentary rock, or iron-rich sediments, and pore fluid chemistry in a specific geological setting, the temperature ranges described herein may be present in areas where there is excess geothermal heating of the ground which increases the kinetics of the pyritization and/or pyritization plus serpentinization/decarbonation reactions.

C. can be obtained at a depth of one kilometer, while kinetics improves in the pyritization reaction until about 300° C., when Sabatier reactions can start to consume the generated hydrogen by reforming with $CO_2$ or dissolved inorganic carbon to produce abiogenic methane or other species if there is sufficient carbon dioxide fugacity in the pore fluid system. The temperatures of target formations capable of generating hydrogen by the reaction described herein can be maintained by the excess heat from the ambient geothermal gradient and the exothermic heat released by mineralization. The temperatures of the formation can be maintained for periods of between about 1 day and multiple decades. It being understood the temperature can be maintained for greater than about 30 days, greater than about 45 days, and greater than about 90 days, less than about 30 days, less than about 20 days, from about 1 day to more than 30 years.

A factor, among many, in determining and configuring the application of SEHP and SCMEHP techniques, such as in natural geothermal settings, is the limitation of the porosity and fracture network in many subsurface formations as well as redox conditions of the natural system (pH and Eh).

TABLE 2

Decarbonation Reactions

| Mineral | Mineral Phase | Reaction | Moles of Igneous Mtrls | Moles of $CO_2$ Sequestered |
|---|---|---|---|---|
| Olivine | Forsterite | $Mg_2SiO_4 + 2CO_2 \xrightarrow{yields} 2MgCO_3 + SiO_2$ | 1 | 2 |
| Pyroxene | Enstatite | $Mg_2Si_2O_6 + 2CO_2 \xrightarrow{yields} 2Mg_3CO_3 + 2SiO_2$ | 1 | 2 |
| Plagioclase | Anorthite | $CaAl_2Si_2O_8 + 2H_2O \xrightarrow{yields} CaCO_3 + Al_2Si_2O_5(OH)_4$ | 1 | 1 |
| Serpentine | Anorthite | $Mg_3Si_2O_5(OH)_4 + 3CO_2 \xrightarrow{yields} 3MgCO_3 + 2SiO_2 + 2H_2O$ | 1 | 3 |
| Brucite | Enstatite | $Mg(OH)_2 + CO_2 \xrightarrow{yields} MgCO_3 + 2H_2O$ | 1 | 1 |

Tables 1 and 2 show serpentinization and decarbonation reactions that generate hydrogen and mineralize $CO_2$. For example, with a geothermal gradient of 100° C./km (e.g., near geothermal systems), the reaction temperature of 100° Preferably, these factors should be understood and addressed in evaluating a subsurface resource, and in applying a system and method for recovering a resource, e.g., hydrogen, from a reservoir.

TABLE 3

Pyritization Reactions

| Reaction | Moles of Iron (II) Reacted | Moles of $H_2$ Generated | Moles of $H_2S$ Sequestered |
|---|---|---|---|
| $FeS + H_2S \xrightarrow{yields} FeS_2 + H_2$ | 1 | 1 | 1 |
| $Fe^{2+} + 2H_2S \xrightarrow{yields} FeS_2 + H_2 + 2H^+$ | 1 | 1 | 2 |
| $Cu^+ + Fe^{2+} + 2H_2S \xrightarrow{yields} CuFeS_2 + 0.5H_2 + 3H^+$ | 1 | 0.5 | 2 |

Embodiments involve injecting gaseous dihydrogen sulfide ($H_2S$), $H_2S$ dissolved in or combined with specifically treated or heated steam, water, hot water, brine, pressurized hot water, gray water, wastewater, seawater, geothermal fluids, geothermal exhaust fluids, or other heated thermal (e.g., waste heat) fluids (SEHP), or gaseous, super critical, or $H_2S$ mixtures dissolved in or combined with specifically treated or heated steam, water, hot water, brine, pressurized hot water, gray water, wastewater, seawater, geothermal fluids, geothermal exhaust fluids, or other heated thermal (e.g., waste heat) fluids (SCMEHP) into geologically or incipiently fractured subsurface formations with sufficient ambient geothermal conditions (e.g., exhibiting temperatures in ranges disclosed herein). The techniques disclosed herein can leverage the co-occurrence of $H_2S$ in geothermal systems, which is an important challenge of operating traditional geothermal energy systems or in applying other means of hydrogen production in geological systems with high (greater than 20° C./km) natural geothermal gradients and may improve the economics and environmental impacts of existing and developing geothermal energy. The presence of $H_2S$ itself must often be abated and can lead to significant economic and environmental issues with operating traditional geothermal systems, while similar challenges may be anticipated by other means of hydrogen production. Here, the $H_2S$ co-produced with specifically treated or heated steam, natural hydrogen, or a mixture of other gases from geothermal systems can be injected directly or co-injected with specifically treated or heated steam, water, hot water, brine, pressurized hot water, gray water, wastewater, seawater, geothermal fluids, geothermal exhaust fluids, or other heated thermal fluids to increase the kinetics and yields of pyritization reactions that produce $H_2$ directly. The injected $H_2S$ increases the kinetics and yields of chemical alteration of the subsurface formation which increases surface area and rock volumes for ongoing reactions during subsequent phases of SEHP.

Other embodiments may also involve injecting gaseous $H_2S$, $H_2S$ dissolved in or combined with specifically treated or heated steam, water, hot water, brine, pressurized hot water, gray water, wastewater, seawater, geothermal fluids, geothermal exhaust fluids, or other heated thermal (e.g., waste heat) fluids, or gaseous, super critical, or $H_2S$ mixtures dissolved in or combined with specifically treated or heated steam, water, hot water, brine, pressurized hot water, gray water, wastewater, seawater, geothermal fluids, geothermal exhaust fluids, or other heated thermal (e.g., waste heat) fluids into geologically or incipiently fractured subsurface formations with sufficient ambient geothermal conditions (e.g., exhibiting temperatures in ranges disclosed herein). The techniques disclosed herein can leverage the co-occurrence of anthropogenic $H_2S$ sources (e.g., fossil fuel-fired power plants, industrial waste streams, refineries, gas separation systems, ethanol plants, steel mills, liming operations, cement factories, waste incinerators, landfills, metallurgy plants, coking facilities, pulp and paper manufacturing, sewage treatment facilities, gas processing exhaust or rejectate, processed natural gas, processed $H_2S$ from natural gas, or other low BTU natural gas reservoirs) and may similarly improve the economics and environmental impacts of those industries. The presence of $H_2S$ itself must often be abated and can lead to significant economic and environmental issues with operating these types of processes at commercial scales, while similar challenges may be anticipated by other means of hydrogen production. Here, the $H_2S$ co-produced with fossil fuel-fired power plants, industrial waste streams, refineries, gas separation systems, ethanol plants, steel mills, liming operations, cement factories, waste incinerators, landfills, metallurgy plants, coking facilities, pulp and paper manufacturing, sewage treatment facilities, gas processing exhaust or rejectate, processed natural gas, processed $H_2S$ from natural gas, or other low BTU natural gas reservoirs, or others can be injected directly or co-injected with specifically treated or heated steam, water, hot water, brine, pressurized hot water, gray water, wastewater, seawater, geothermal fluids, geothermal exhaust fluids, or other heated thermal (e.g., waste heat) fluids to increase the kinetics and yields of pyritization reactions that produce $H_2$ directly. The injected $H_2S$ increases the kinetics and yields of chemical alteration of the subsurface rock formation which increases surface area and rock volumes for ongoing reactions during subsequent phases of SEHP, SCMEHP, or other means of subsurface enhanced hydrogen production.

In general, further improvement of SEHP and SCMEHP can be provided by utilizing additional $H_2S$ waste streams from geothermal power plants, fossil fuel-fired power plants, industrial waste streams (e.g., refineries, gas separation systems, ethanol plants, steel mills, liming operations, cement factories, waste incinerators, landfills, metallurgy plants, coking facilities, pulp and paper manufacturing, sewage treatment facilities), gas processing exhaust or rejectate, processed natural gas, processed $H_2S$ from natural gas, or other low BTU natural gas reservoirs; this can also be applied to natural geothermal systems. In general, the further improvement of SCMEHP can be provided by utilizing additional $H_2S$ and $CO_2$ waste streams from geothermal power plants, industrial waste streams (e.g., refineries, sewage treatment facilities, pulp and paper manufacturing), gas processing exhaust or rejectate, processed natural gas, processed $H_2S$ from natural gas, or other natural gas reservoirs.

In some embodiments, during interactions between an iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral bearing rock or sediment, partially or completely serpentinized rock, serpentinite, pyrite, iron-rich sandstone, other iron-rich sedimentary rock, or iron-rich sediments and $H_2S$ fluids, as described above, SEHP and SCMEHP can be benefitted in several related, but independent manners: first, reduced iron mineral phases in iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral bearing rock or sediment, partially or completely serpentinized rock, serpentinite, pyrite, iron-rich sandstone, other iron-rich sedimentary rock, or iron-rich sediments and the tandem liberation of zero-carbon and sulfur-negative hydrogen when using SEHP. Second, reduced iron mineral phases in iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral bearing rock or sediment, partially or completely serpentinized rock, serpentinite, pyrite, iron-rich sandstone, or iron-rich sediments, and/or perovskite provide a catalyst for mineralization of sulfur as pyrite ($FeS_2$), or other sulfur minerals, or carbon dioxide in various carbonate minerals, in the olivine- or pyroxene-bearing igneous rock, olivine- or pyroxene-bearing sediment or sedimentary rock, or olivine- or pyroxene-bearing metamorphic rock, and the tandem liberation of carbon-negative hydrogen when using SCMEHP. Third, because chemical alteration of olivine, pyroxene, and other minerals is improved by the pyritization process, the subsurface formation achieves increased porosity, permeability, and hence greater capacity for further hydrogen generation, carbon and sulfur mineralization, and improved kinetic rates and yields of reaction.

In a well in the earth, SEHP can include injecting dihydrogen sulfide ($H_2S$) into geologically or incipiently fractured subsurface formations with sufficient ambient geothermal conditions. SEHP can leverage the common co-occurrence of $H_2S$ in geothermal systems, near anthropogenic waste streams, or in sulfur-rich gas fields, which is an important challenge of operating traditional geothermal energy systems or in applying other means of subsurface hydrogen production.

In some embodiments, SCMEHP may be utilized in a manner similar or identical to SEHP to produce subsurface hydrogen. SCMEHP also leverages the pyritization reactions (shown in Table 3) that use the iron-rich mineral phases (e.g., olivine and pyroxene), as well as minor perovskite mineral phases, as a catalyst for sulfide reduction to pyrite mineral phases and the production of $H_2$ gas and integrates this reaction with serpentinization (i.e., hydrogen-forming) and decarbonation (i.e., carbon mineralization) reactions (shown in Tables 1 and 2).

The benefits of SCMEHP compared to other forms of enhanced hydrogen production relate to the increased porosity and permeability that can be achieved through the pyritization reaction and how the increased porosity and permeability can be utilized to further reactions in the rock formation, especially when utilized in various or repeated steps. For example, the pyritization reaction chemically alters olivine, pyroxene, and other iron-rich mineral (e.g., ilmenite, siderite, hematite, and actinolite) grains, which increases surface area of the residual grains and as such further improves the kinetic rates and total yields of the reaction; this is improved by decreases in pH that further changes the chemical alteration of ambient mineral grains. Further, the formation of pyrite results in the formation of minerals with dense, isometric/cubic lattice structures that increases the density, but reduces the volume of pyrite minerals with respect to the original olivine, orthopyroxene, or other iron-rich minerals (e.g., ilmenite, siderite, hematite, actinolite). A net result of this volume reduction is an increase in the porosity (i.e., volume of non-rock pore spaces) of the subsurface rock formation.

The increase in porosity further increases the surface area and permeability of that rock formation and catalyzes further reactions and increased interaction volumes. These factors are critical to the kinetics and ultimate yield of hydrogen in and of themselves, but also based on the reaction's ability to increase the transmission of fluids into unaltered rock. Fluid flow, both injected fluids into the system and hydrogen out of the system, requires sufficient permeability and benefit from the increased hydraulic conductivity demonstrated by the SEHP and SCMEHP techniques. Hydraulic conductivity, and specifically the flux of fluids into or out of the target system, varies as a function of the porosity and permeability, where the latter generally increases proportionally to the former. Thus, as the result of the SEHP process or the pyritization plus serpentinization (hydrogen-forming) and decarbonation (carbon mineralization) SCMEHP process, the target subsurface formation can accommodate the injection of more fluids (e.g., carbon dioxide, dihydrogen sulfide, water) and more efficient retrieval of hydrogen (or other resources, including helium, neon, krypton, and xenon). Notably, the serpentinization reaction directly produces hydrogen gas that can be recovered as a low- or negative-carbon resource. As such, injected fluids can be exposed to larger amounts of surface areas and larger overall volumes of target rocks in the target system. The net result of this process, benefited by the addition of dihydrogen sulfide or dihydrogen sulfide mixtures with carbon dioxide, is that eventually more sulfur and/or carbon dioxide can be mineralized, and more hydrogen can be generated from the system by improving porosity and permeability of the target subsurface formation.

Further benefits to the SCMEHP process relate to the fact that these reactions can be done sequentially, iteratively, or in other combinations with other forms of enhanced hydrogen production or re-stimulation of the target formation to increase the hydrogen generation and sulfur and/or carbon mineralization compared to other forms of enhanced hydrogen production that do not utilize mixtures of dihydrogen sulfide and carbon dioxide. As an example, a cycle of pyritization or SCMEHP could be expected to increase porosity and permeability, which would increase the flow of injection fluids; this process can lead to a second phase of SCMEHP wherein the mineralization of carbon dioxide can increase the mineral volume and induce new fractures, while localized mineralization can effectively prop fractures open and subsequently preserve both porosity and permeability in subsurface formations. Each of these processes increases the surface area for hydrogen production and the pathways by which to recover hydrogen.

The injection of various fluid mixtures can be done sequentially or in cycles, including cycles with these and other forms of subsurface enhanced hydrogen production. In embodiments, a cycle of first injecting dihydrogen sulfide or mixture of dihydrogen sulfide and carbon dioxide dissolved in or combined with specifically treated or heated steam, water, hot water, brine, pressurized hot water, gray water, wastewater, seawater, geothermal fluids, geothermal exhaust fluids, or other heated thermal (e.g., waste heat) fluids can be followed by injection of gaseous or super-critical dihydrogen sulfide or a mixture of gaseous or super-critical dihydrogen sulfide and carbon dioxide can be utilized. In embodiments, a cycle of first injecting gaseous or super-critical dihydrogen sulfide or a mixture of gaseous or super-critical dihydrogen sulfide and carbon dioxide can be followed by a cycle of injecting dihydrogen sulfide or a mixture of dihydrogen sulfide and carbon dioxide dissolved in or combined with specifically treated or heated steam, water, hot water, brine, pressurized hot water, gray water, wastewater, seawater, geothermal fluids, geothermal exhaust fluids, or other heated thermal (e.g., waste heat) fluids.

In embodiments, the pyritization and decarbonation/serpentinization reactions can be enabled in tandem to produce hydrogen when mixtures of dihydrogen sulfide and carbon dioxide gas are injected into the subsurface formation. Using either the SEHP or SCMEHP process, this injection can occur when these fluids are injected into subsurface systems with elevated ambient temperature conditions, i.e., geothermal systems with temperatures ranging from about 25-500° C., depending on the mineralogy, pore size, fracture intensity, pore fluid composition, and purity of gas injectate, or when the temperature is augmented using treated and temperature controlled fluids. SEHP and SCMEHP also provide for the opportunity to sequester (by mineralization) sulfur or carbon dioxide from natural (e.g., geothermal systems) or various anthropogenic sources when used alone, or in combination with HAEHP.

In an embodiment, a well or a series of injector/producer wells would be drilled into a formation of iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral bearing rock or sediment, partially or completely serpentinized rock, serpentinite, pyrite, iron-rich sandstone, other iron-rich sedimentary rock, or iron-rich sediments would be further fractured to increase porosity and permeability, and hence improve the available reaction surface area and volume. Reactants such as dihydrogen sulfide or mixtures of dihydrogen sulfide and carbon dioxide (in gaseous or super critical form) could then be injected in natural geothermal systems with sufficient temperatures to catalyze the pyritization or pyritization and decarbonation/serpentinization reactions. In some embodiments, fluid containing one or more of specifically treated or heated steam, water, hot water, brine, pressurized hot water, gray water, wastewater, seawater, geothermal fluids, geothermal exhaust fluids, or other heated thermal (e.g., waste heat) fluids could then be added to the subsurface formation. $H_2$ produced from a reaction of the reactant and the subsurface formation can be collected and mineralized carbon and sulfur can be sequestered within the subsurface formation.

The fluid(s) containing dihydrogen sulfide or combination of dihydrogen sulfide and carbon dioxide may be injected into a geological formation (e.g., geothermal system) via the injector/injection well. Hydrogen gas formed in the subsurface formation may be collected in the injector well or in a separate hydrogen producer or recovery well. In some embodiments, hydrogen can be collected from a recovery well. The recovery well can be specifically designed for hydrogen gas production. In some embodiments, the hydrogen can be stored in large amounts for long periods of time. This is advantageous for the shipping industry, as well as transportation in general, industrial, and energy sectors. Further, hydrogen can be used for refining petroleum, treating metals, producing fertilizer, and processing foods.

The SEHP 200 and SCMEHP 300 methodologies may include cycling various fluids described herein in and out or and injector/producer pair of wells working together. In either case, continuous or cyclic injection of $H_2S$ or mixtures of $H_2S$ plus $CO_2$ may very closely maintain the temperature of chemical reactions in the target formation to a selected reaction temperature. Given that rock and pore fluid chemistry may differ from prospect to prospect, the selected reaction temperature may be different. The temperature may be adjusted for each prospect based on experiments conducted on core, rock, and pore fluid samples taken from the prospect.

While the techniques disclosed herein are accomplished using $H_2S$ and/or $CO_2$, it should be understood that alternate chemical species may be utilized to increase the kinetics and yield of the production of hydrogen by chemical alteration of minerals in subsurface formations. For example, halogen acids (e.g., HF, HCl, HBr, or HI), sulfuric acid, or further chemical species may be utilized to increase the kinetics and yield of subsurface reactions to produce hydrogen using subsurface minerals as a catalyst.

Systems suitable for use in the techniques disclosed herein may include one or more wells (e.g., injector or producer wells), a source of one or more of dihydrogen sulfide or a combination of dihydrogen sulfide and carbon dioxide, one or more pumps to pump the one or more of dihydrogen sulfide or a combination of dihydrogen sulfide and carbon dioxide into the one or more wells, a downhole temperature sensor, hydrogen collection equipment, and a controller operably coupled to one or more of the foregoing to control injection of solution into the subsurface formation and collection of hydrogen from the subsurface formation.

Figure 5:
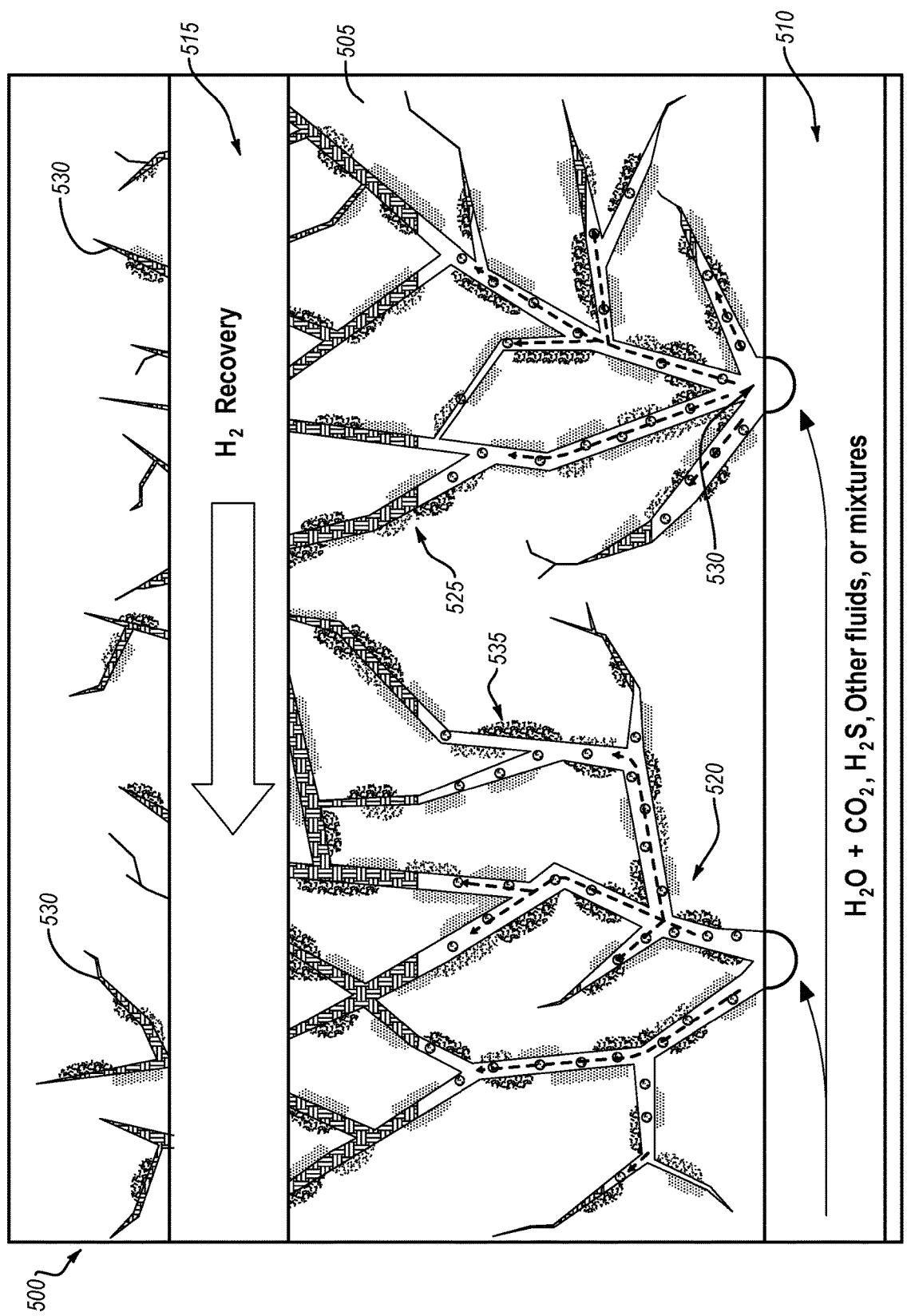
FIG. 5 is a schematic illustration of heat-assisted enhanced hydrogen production with embodiments of carbon or sulfur sequestration in a subsurface formation, according to an embodiment.

FIG. 5 is an illustration showing HAEHP 500 with embodiments of carbon or sulfur sequestration in a subsurface formation, according to an embodiment. HAEHP 500 involves injecting specifically treated or heated steam, water, hot water, brine, pressurized hot water, gray water, wastewater, seawater, geothermal fluids, geothermal exhaust fluids, or other heated thermal (e.g., waste heat) fluids, carbon dioxide ($CO_2$) or other fluids or mixtures of gaseous or super critical carbon dioxide ($CO_2$) or carbon dioxide ($CO_2$) dissolved in or combined with specifically treated or heated steam, water, hot water, brine, pressurized hot water, gray water, wastewater, seawater, geothermal fluids, geothermal exhaust fluids, or other heated thermal (e.g., waste heat) fluids, dihydrogen sulfide ($H_2S$) or other fluids or mixtures of gaseous or super-critical dihydrogen sulfide ($H_2S$) or dihydrogen sulfide ($H_2S$) dissolved in or combined with specifically treated or heated steam, water, hot water, brine, pressurized hot water, gray water, wastewater, seawater, geothermal fluids, geothermal exhaust fluids, or other heated thermal (e.g., waste heat) fluids, or mixture of carbon dioxide ($CO_2$) and dihydrogen sulfide ($H_2S$) or other fluids through an injection well 510 into a porous, permeable, faulted, or geologically or incipiently fractured subsurface formation 505 with sufficient ambient geothermal conditions, using heat sources external to the geological system.

The hydrogen gas can be recovered from recovery well 515. Within the subsurface rock formation 505 the serpentinization reaction occurs in region 520 and pyritization reactions are shown in region 525. Further, a $CO_2$ reduction to carbonate minerals occurs as shown in region 535. The reactions can occur in natural or induced fractures 530 throughout the subsurface formation 305.

An embodiment of HAEHP 500 leverages the co-occurrence of geothermal heat with natural sources of $CO_2$ and $H_2S$ that are released to the environment during traditional geothermal energy extraction. Geothermal waste $CO_2$ and $H_2S$ represent an important challenge of operating traditional geothermal energy systems or in applying other means of hydrogen production in geological systems with high (>20° C./km), natural geothermal gradients. The presence of $H_2S$ specifically must often be abated and can lead to significant economic and environmental issues with operating traditional geothermal systems. Similarly, there are societal and environmental drivers to mitigate $CO_2$ release associated with geothermal energy.

Embodiments herein disclose that $CO_2$ and/or $H_2S$ co-produced with steam, natural hydrogen, or a mixture of other gases from geothermal systems can treated and temperature controlled before being injected directly or co-injected with specifically treated or heated steam, water, brine, pressurized hot water, gray water, wastewater, seawater, geothermal fluids, geothermal exhaust fluids, other heated thermal (e.g., waste heat) fluids, or other fluids. This embodiment beneficiates low carbon and low sulfur hydrogen by increasing fluid and formation temperature using heat sources external to the geological system.

HAEHP can encourage hydrogen formation by injecting various forms of heated water to proliferate the serpentinization reactions. In some embodiments, hydrogen formation can also be encouraged by injecting heated fluids before, during, or following carbon dioxide injection to stimulate serpentinization and decarbonation reactions and/or injecting $H_2S$ and other fluids to catalyze the pyritization reaction described above in reference to FIGS. 2 and 3 (i.e., SEHP and/or SCMEHP). These embodiments can produce low-carbon $H_2$ directly and sequester carbon and sulfur. Notably, HAEHP can also be applied to heat-assisted production systems in geological settings that do not benefit from naturally elevated geothermal conditions/gradients, but by using a variety of sources of heat and/or waste heat can deliver key reactants (i.e., heat, water, carbon dioxide, and dihydrogen sulfide) to geological formations with abundant reduced iron reactants but deficient in those key reactants to produce hydrogen, carbonate minerals, and sulfide minerals as products. Thus, HAEHP 500 benefits from both natural and anthropogenic sources of $CO_2$ and $H_2S$, the latter including those associated with other forms of fossil energy, other means of energy generation, and other means of hydrogen production.

The embodiments herein provide an important low-carbon or negative-carbon and negative-sulfur production pathways for hydrogen that utilize injectate fluids heated from sources external to the geological system and rely on the serpentinization/decarbonation and pyritization reactions described in Tables 1-3 above.

In an embodiment of HAEHP, the reactions that generate hydrogen and sequester carbon and sulfur can be achieved with higher kinetics (e.g., faster) and higher yields when heated carbon dioxide gas, heated dihydrogen sulfide, heated fluid mixtures of carbon dioxide, heated fluid mixtures of dihydrogen sulfide, heated fluid mixtures of carbon dioxide and dihydrogen sulfide, or supercritical forms of carbon dioxide or dihydrogen sulfide are injected into porous, faulted, or geologically or incipiently fractured iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral bearing rock or sediment, partially or completely serpentinized rock, serpentinite, pyrite, iron-rich sandstone, other iron-rich sedimentary rock, or iron-rich sediment systems when mixed with the injection of specifically treated or heated steam, water, hot water, brine, pressurized hot water, gray water, wastewater, seawater, geothermal fluids, geothermal exhaust fluids, or other heated thermal (e.g., waste heat) fluids with various topside integrations of heat that are injected to depth by various means of resistive heating, plasma, combustion, nuclear reactions, waste heat recovery, or other means after the fluid containing carbon dioxide or dihydrogen sulfide is introduced to achieve reservoir temperatures ranging from about 25° C. to about 500° C., depending on the mineralogy, pore size, fracture intensity, pore fluid composition, and purity of gas injectate.

HAEHP 500 significantly improves the geological/geographical breadth of enhanced hydrogen production applications to geological systems with the right set of reactant minerals (e.g., olivine, orthopyroxene, ilmenite, siderite, hematite, actinolite bearing rocks) without excess thermal energy (e.g., no geothermal heat, no areas without excess geothermal gradients) or other key reactants (e.g., water, dihydrogen sulfide, carbon dioxide). Thus, integration of this embodiment greatly improves recovery of low-carbon hydrogen and potential to sequester (by mineralization) carbon and/or sulfur from natural (e.g., geothermal systems) or anthropogenic sources.

A preferred temperature range for the decarbonation, serpentinization, and pyritization reactions embodied in HAEHP is between about 25° C. to about 500° C. The temperature can be greater than about 100° C., greater than about 120° C., greater than about 150° C., less than about 500° C., less than about 400° C., from about 90° C. to about 500° C., from about 150° C. to about 250° C., and all temperatures with these values and as well as higher and lower temperatures. Depending on the depth, geothermal gradient conditions of the subsurface formation, and pore fluid chemistry in a specific geological setting, the temperature ranges described may be present in areas where there is excess geothermal heating of the ground or sufficient geothermal gradients will be introduced by various means described herein to increase the kinetics and yields of the serpentinization, pyritization, and decarbonation reactions. The selected temperature can be achieved with topside integration of heated fluids using heat from sources external to the geological setting. The fluid that is injected is heated, cooled, or otherwise temperature controlled to match the range of selected temperatures, or specific temperatures in the case of some specific reservoirs, into subsurface rock formations to reach and maintain the selected reaction temperature and expedite the kinetic rates and yields of the target reactions (e.g., serpentinization, decarbonation, pyritization) as well as suppress undesired follow-on reactions (e.g., Sabatier reactions) that would otherwise consume newly generated hydrogen and form abiogenic methane or other species. While some heat may be lost through conduction into the surrounding rock, over time, the rock closest to the reaction zone will increase in temperature towards the selected temperature or range, allowing fluid-rock reactions of decarbonation, serpentinization, and/or pyritization to occur and to occur at higher kinetic rates capable of more closely approximating thermodynamic equilibrium. Further, the exothermic nature of the reactions will increase or maintain the ongoing production of heat and hence modulate the temperature in the target formation.

In subsurface rock formations with a geothermal gradient of 100° C./km, the reaction temperature of 100° C. can be obtained at a depth of one kilometer, while kinetics improves until about 300° C., when Sabatier reactions can start to consume the generated hydrogen by reforming with carbon dioxide or dissolved inorganic carbon (if present) to produce abiogenic methane or other species. The temperatures of target formations capable of generating hydrogen by the reaction described herein can be maintained by one or more of the injection of heated carbon dioxide gas, heated dihydrogen sulfide, carbon dioxide gas, dihydrogen sulfide gas, supercritical carbon dioxide, supercritical dihydrogen sulfide, or other gaseous or supercritical fluids, specifically treated or heated steam, water, hot water, brine, pressurized hot water, gray water, wastewater, seawater, geothermal fluids, geothermal exhaust fluids, other heated thermal (e.g., waste heat) fluids, or any of these other heated fluids combined with heated carbon dioxide gas, heated dihydrogen sulfide, supercritical carbon dioxide, supercritical dihydrogen sulfide, or other gaseous or supercritical fluids, through the heat released by serpentinization, pyritization, or decarbonation reactions, or optionally with the excess heat from the ambient geothermal gradient. In any of these cases, the temperatures of the formation can be maintained for periods of between about 1 day and multiple decades. It being understood the temperature can be maintained for greater than about 30 days, greater than about 45 days, and greater than about 90 days, less than about 30 days, less than about 20 days, from about 1 day to more than 30 years.

In general, embodiments disclosed herein provide for the further stimulus of HAEHP by utilizing additional $CO_2$ and $H_2S$ waste streams from sources including geothermal power plants, fossil fuel-fired power plants, industrial waste streams (e.g., refineries, gas separation systems, ethanol plants, steel mills, liming operations, cement factories, waste incinerators, landfills, metallurgy plants, coking facilities, sewage treatment facilities, pulp and paper manufacturing), gas processing exhaust or rejectate, processed natural gas, other low BTU natural gas reservoirs, or the like. HAEHP can be applied to natural geothermal or geological systems that contain the subsurface formations but require heat-assist or other key reactants (e.g., water, $CO_2$, $H_2S$). The latter could supplement geothermal heating of the iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral bearing rock or sediment, partially or completely serpentinized rock, serpentinite, pyrite, iron-rich sandstone, other iron-rich sedimentary rock, or iron-rich sediments and considerably broaden application of HAEHP.

Figure 6:
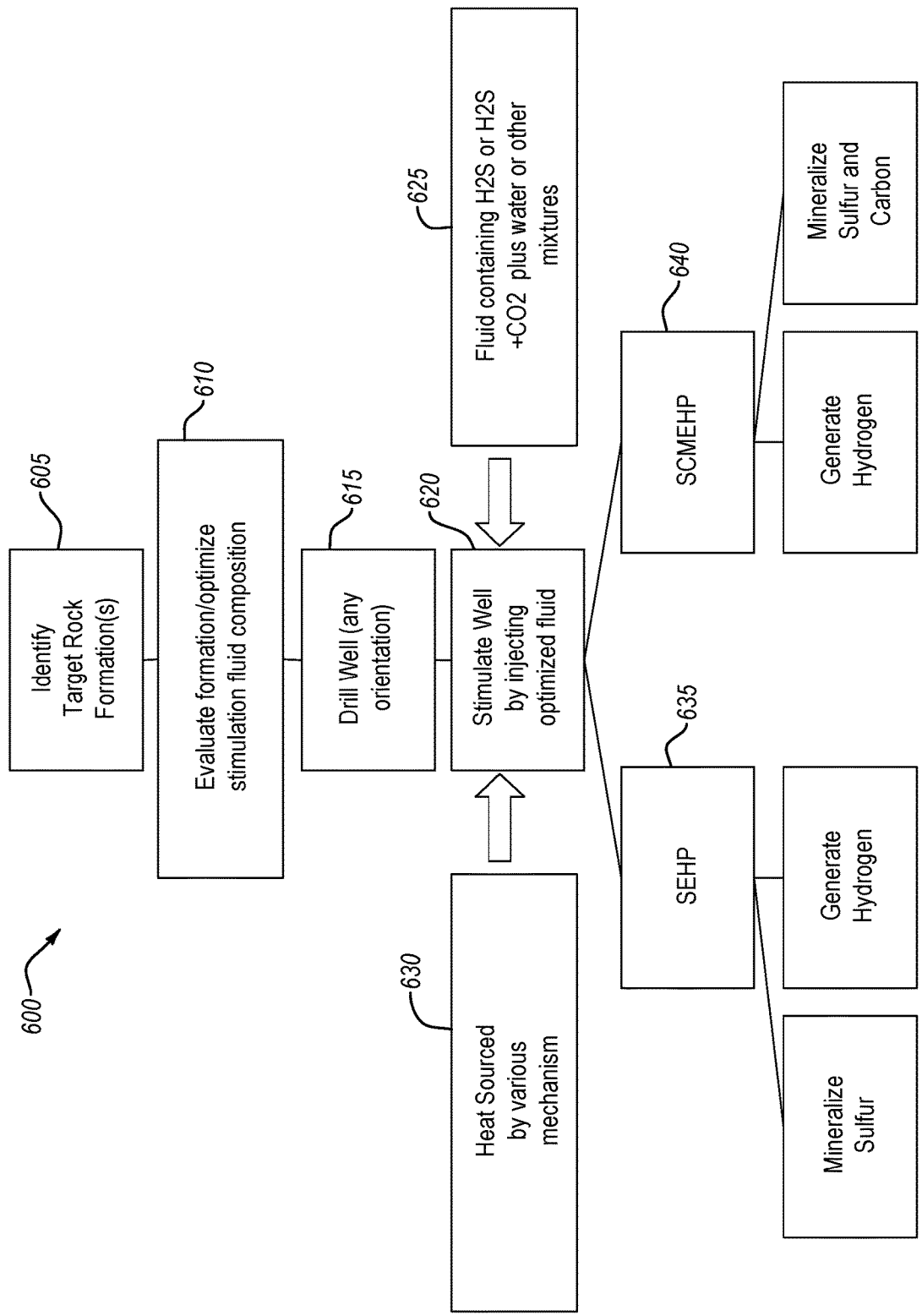
FIG. 6 is a flow chart of methods for heat-assisted enhanced hydrogen production, according to an embodiment.

FIG. 6 is a flow chart of a method 600 for performing HAEHP, according to an embodiment. As shown in act 605, target rock formations may be identified. The target rock formation may be evaluated for rock/mineral types and a stimulation fluid (e.g., temperature, heated water, carbon dioxide, dihydrogen sulfide) may be formulated according to the rock/mineral types in the target rock formation, as shown in act 610. In act 615, a well may be drilled or an existing well may be used to deliver the stimulation fluid to the target rock formation. In act 620, the rock/minerals in the subsurface formation may be stimulated by injecting heated stimulation fluid into target geologic formations in the well. The heat for the heated stimulation fluid may be provided by equipment located on the surface (e.g., topside) or at depth in the well. The heat is provided, at least in part, as shown in acts 625 and 630, by sources external to the geological formation. Depending upon the composition of the fluid injected into the subsurface rock formation, HAEHP can be carried out in situ in the target rock formation. HAEHP generates hydrogen and is capable of mineralizing carbon and sulfur in the rock formation. Accordingly, hydrogen is produced and carbon, sulfur, or other injectates may be sequestered.

Depending upon the composition of the fluid injected into the subsurface rock formation, one or more of SEHP or SCMEHP is carried out in situ in the target rock formation. As shown in act 635, SEHP generates hydrogen and mineralizes sulfur in the rock formation. As shown in act 640, SCMEHP generates hydrogen and mineralizes both sulfur from dihydrogen sulfide and carbon from carbon dioxide in the rock formation. Accordingly, hydrogen is produced and one or more of sulfur, carbon, or other injectates may be sequestered.

The benefits of HAEHP or heat-assisted forms of SEHP or SCMEHP compared to other forms of enhanced hydrogen production relate to the increased kinetics, increased yield of hydrogen, and increased sequestration of carbon from the serpentinization and decarbonation reactions. Fluid flow, both of injected fluids into the system and hydrogen out of the system, operates via hydraulic conductivity. Hydraulic conductivity and specifically the flux of fluids into or out of the target system vary as a function of the porosity and permeability, where the latter generally increases proportionally to the former. A factor, among many, in determining and configuring the application of HAEHP in either natural geothermal settings, heat-assisted hydrogen production systems, SEHP, or SCMEHP is the limitation of the porosity and fracture network in many subsurface formations, as well as redox conditions of the natural system (pH and Eh). Preferably, these factors should be understood and addressed in evaluating a subsurface resource; and in applying systems and methods for recovering a resource, e.g., hydrogen, from a reservoir.

For example, more carbon dioxide or dihydrogen sulfide in the injectate fluid may be utilized in certain rock formations depending upon the rock type, porosities, and permeabilities than in other rock formations with different rock types, porosity, or permeability. Additionally, iron-rich rock, mafic igneous rock, metamorphosed or hydrothermally altered mafic igneous rock, olivine- or pyroxene-bearing igneous, metamorphic, or sedimentary rock or sediment, metamorphosed or hydrothermally altered olivine- or pyroxene-bearing igneous, metamorphic, or sedimentary rock or sediment, serpentine mineral bearing rock or sediment, partially or completely serpentinized rock, serpentinite, pyrite, iron-rich sandstone, other iron-rich sedimentary rock, or iron-rich sediments may be further fractured, acid treated, or stimulated to increase porosity and permeability, and hence the available reaction surface area and volume of the rock.

In an embodiment, a well or a series of injector/producer wells can be drilled into a subsurface formation in heat-assisted subsurface systems and optionally natural geothermal subsurface systems. The injection of heated fluid containing $CO_2$ or $H_2S$ into the well (and rock formation) can be carried out using any of the fluids discussed herein. When these fluids are injected into subsurface systems with elevated ambient temperature conditions, i.e., geothermal systems with temperatures ranging from about 25° C. to about 500° C., depending on the mineralogy, pore size, fracture intensity, pore fluid composition, and purity of gas injectate, the serpentinization, decarbonation, and pyritization reactions may be carried out at increased kinetic rates and yields compared to techniques using non-heated fluids. HAEHP provides for the recovery of hydrogen and potential to sequester (by mineralization) carbon dioxide and dihydrogen sulfide from natural sources (e.g., geothermal systems) or from various other anthropogenic sources.

The fluid including one or more of specifically treated or heated steam, water, hot water, brine, pressurized hot water, gray water, wastewater, seawater, geothermal fluids, geothermal exhaust fluids, or other heated thermal (e.g., waste heat) fluids could be heated up at pressure, to the form of high-pressure steam or high-pressure, high-temperature fluids, held at temperatures between about 25° C. to about 500° C., and mixed with a supply of $CO_2$ and/or $H_2S$ may be injected into the subsurface formation to carry out the HAEHP.

Figure 7:
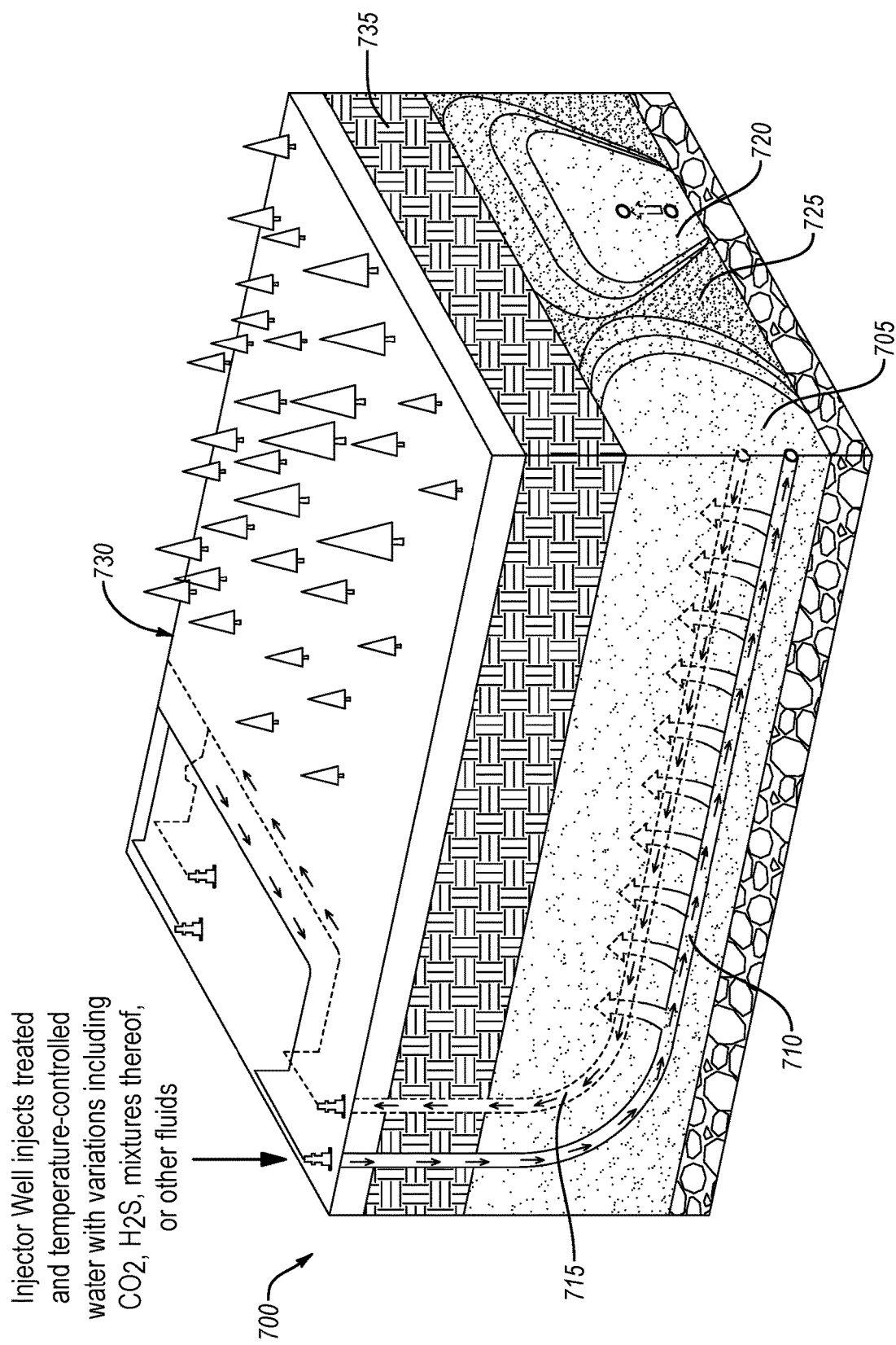
FIG. 7 is a schematic illustration of heat-assisted enhanced hydrogen production in a subsurface formation, according to an embodiment.

FIG. 7 is a schematic illustration of HAEHP 700 in a subsurface formation 705, according to an embodiment. Gaseous, dissolved, or super-critical carbon dioxide or dihydrogen sulfide can be injected directly into a geological formation via the injector/injection well 710. The well extends into the subsurface formation 705. Hydrogen gas formed in the subsurface formation may be collected in the injector well or in a separate hydrogen producer or recovery well 715. After the collection of hydrogen gas, it can be stored or mixed with other gases (e.g., methane) for stable transportation and/or use.

In some embodiments, HAEHP may include injecting specifically treated or heated steam, water, hot water, brine, pressurized hot water, gray water, wastewater, seawater, geothermal fluids, geothermal exhaust fluids, other heated thermal (e.g., waste heat) fluids, gaseous $CO_2$, super-critical $CO_2$, gaseous $H_2S$, super-critical $H_2S$, or other heated thermal fluids into the subsurface formation. $CO_2$, gaseous $H_2S$, and/or super-critical $H_2S$ may be dissolved in or combined with specifically treated or heated steam, water, hot water, brine, pressurized hot water, gray water, wastewater, seawater, geothermal fluids, geothermal exhaust fluids, or other heated thermal (e.g., waste heat) fluids and injected into the subsurface formation to increase hydrogen generation.

In some embodiments, heat may be transferred to the subsurface formation via injection of hot supercritical $CO_2$ or $H_2S$, as well as or in place of hot water. In other embodiments, other means of heat may be applied downhole to the rock formation, including, but not limited to laser heating, combustion, electrical resistance heating, plasma heating, nuclear heating, heat released by the exothermic nature of the reactions or by other means. Heating by these mechanisms can achieve suitable temperatures of about 25° C. to about 500° C. in the reservoir or rock formation at depth depending on the physicochemical conditions of the water, pore spaces, and chemical species present in the pore spaces and mineralogy and chemistry of the rock matrix of any given prospect.

In some examples, the subsurface rock formation may be fractured, acid treated, or stimulated to increase porosity and permeability, and to further increase the surface area available for the reactions (e.g., serpentinization and pyritization reactions). Specifically treated or heated steam, water, hot water, brine, pressurized hot water, gray water, wastewater, seawater, geothermal fluids, geothermal exhaust fluids, or other heated thermal (e.g., waste heat) fluids, $CO_2$ or $H_2S$ dissolved in or combined with specifically treated or heated steam, water, hot water, brine, pressurized hot water, gray water, wastewater, seawater, geothermal fluids, geothermal exhaust fluids, or other heated thermal (e.g., waste heat) fluids, gaseous $CO_2$ or $H_2S$, super-critical $CO_2$ or $H_2S$, or other heated thermal fluids, may then be heated up at pressure, to form high-pressure fluids with temperatures ranging from 25° C. to 500° C. or thereabouts depending on the physicochemical conditions of the water, pore spaces, and chemical species present in the pore spaces. The heated fluid may then be injected into the fractured subsurface rock formation.

HAEHP may include cycling various heated fluids described herein in and out of injector well 710 (e.g., "huff and puff" operation) or injection in and out of an injector/producer pair of wells 710 and 715 working together. In some embodiments, a cycle of first injecting specifically treated or heated steam, water, brine, hot water, pressurized hot water, gray water, wastewater, seawater, geothermal fluids, geothermal exhaust fluids, or heated thermal (e.g. waste heat) fluids can be followed by injection of $CO_2$ or $H_2S$ dissolved in or combined with specifically treated or heated steam, water, hot water, brine, pressurized hot water, gray water, wastewater, seawater, geothermal fluids, geothermal exhaust fluids, or other heated thermal (e.g., waste heat) fluids, gaseous $CO_2$ or $H_2S$, or super-critical $CO_2$ or $H_2S$. In some embodiments, a cycle of first injecting $CO_2$ or $H_2S$ dissolved in or combined with specifically treated or heated steam, water, hot water, brine, pressurized hot water, gray water, wastewater, seawater, geothermal fluids, geothermal exhaust fluids, or other heated thermal (e.g., waste heat) fluids, gaseous $CO_2$ or $H_2S$, or super-critical $CO_2$ or $H_2S$ can be followed by a cycle of injecting specifically treated or heated steam, water, hot water, brine, pressurized hot water, gray water, wastewater, seawater, geothermal fluids, geothermal exhaust fluids, or other heated thermal (e.g., waste heat) fluids.

Regardless of the embodiment, continuous or cyclic injection of specifically treated or heated thermal fluid and/or reactant will be able to very closely maintain the temperature of the target rock formation at the selected reaction temperatures (e.g., 25° C. to 500° C.) that enable hydrogen generation and prevent consumption of hydrogen by subsequent reactions (e.g., Sabatier reaction). Given that rock mineralogy, rock chemistry, and pore fluids chemistry may differ from prospect to prospect, the selected reaction temperature may be different in different settings. For example, as shown in FIG. 7, the subsurface formation can be located near a steam chamber 720 that contributes to higher temperatures. The steam chamber 720 can be separated from the subsurface formation 705 by unreacted rock 725. The selected temperature may be adjusted for each prospect based on experiments conducted on cores and rock samples or pore fluid samples taken from a given prospect.

Systems suitable for use in the techniques disclosed herein may include one or more wells (e.g., injector or producer wells) extending through the ground surface 730 and a cap rock 735, a source of one or more of carbon dioxide, dihydrogen sulfide, or water, one or more heat sources (e.g., heat exchanger) to heat the carbon dioxide, dihydrogen sulfide, or water, one or more pumps to pump the one or more of carbon dioxide, dihydrogen sulfide, or water into the one or more wells, a downhole temperature sensor, hydrogen collection equipment, and a controller operably coupled to one or more of the foregoing to control injection of a fluid (e.g., heated water, dihydrogen sulfide, and carbon dioxide) into the subsurface formation and collection of hydrogen from the subsurface formation.

It is noted that there is no requirement to provide or address the theory underlying the novel and groundbreaking production rates, performance or other beneficial features and properties that are the subject of, or associated with, embodiments of the present inventions. Nevertheless, various theories are provided in this specification to further advance the art in this important area, and in particular in the important area of hydrogen, carbon dioxide, dihydrogen sulfide, and helium exploration, production, and downstream conversion or utilization. These theories put forth in this specification, and unless expressly stated otherwise, in no way limit, restrict, or narrow the scope of protection to be afforded the claimed inventions. These theories may not be required or practiced to utilize the present inventions. It is further understood that the present inventions may lead to new, and heretofore unknown theories to explain the conductivities, fractures, drainages, resource production, chemistries, and function-features of embodiments of the methods, articles, materials, devices and system of the present inventions; and such later developed theories shall not limit the scope of protection afforded the present inventions.

The various embodiments of devices, systems, activities, methods and operations set forth in this specification may be used with, in, or by various processes, industries and operations, in addition to those embodiments of the Figures and disclosed in this specification. The various embodiments of devices, systems, methods, activities, and operations set forth in this specification may be used with: other processes, industries, and operations that may be developed in the future; with existing processes, industries, and operations, which may be modified, in-part, based on the teachings of this specification; and with other types of gas recovery and valorization systems and methods. Further, the various embodiments of devices, systems, activities, methods, and operations set forth in this specification may be used with each other in different and various combinations. Thus, for example, the configurations provided in the various embodiments of this specification may be used with each other. For example, the components of an embodiment having A, A', and B and the components of an embodiment having A", C, and D can be used with each other in various combination, e.g., A, C, D, and A, A", C, and D, etc., in accordance with the teaching of this specification. Thus, the scope of protection afforded the present inventions should not be limited to a particular embodiment, configuration, or arrangement that is set forth in a particular embodiment, example, or in an embodiment in a particular Figure.

The described embodiments are to be considered in all respects only as illustrative and not restrictive. For example, features from any of the disclosed embodiments may be used in combination with one another, without limitation. In addition, other features and advantages of the present disclosure will become apparent to those of ordinary skill in the art through consideration of the detailed description.

What is claimed is:

1. A method of producing hydrogen from a subsurface formation, comprising:
   injecting a reactant into the subsurface formation;
   reacting the reactant with the subsurface formation to form at least one of hydrogen gas and a mineralized product within the subsurface formation, wherein the mineralized product includes mineralized sulfur; and
   collecting hydrogen produced from a reaction of the reactant with the subsurface formation and sequestering one or more components of the reactant to form mineralized sulfur via a pyritization reaction.

2. The method of claim 1, wherein the reactant comprises dihydrogen sulfide and at least one of carbon dioxide, water, steam, brine, geothermal fluid, or waste heat fluid.

3. The method of claim 1, wherein the subsurface formation comprises at least one of iron-rich rock, mafic igneous rock, metamorphosed or hydrothermally altered mafic igneous rock, olivine- or pyroxene-bearing igneous or metamorphic rock, metamorphosed or hydrothermally altered olivine- or pyroxene-bearing igneous or metamorphic rock, serpentine mineral bearing rock, partially or completely serpentinized rock, serpentinite, pyrite, iron-rich sandstone, other iron-rich sedimentary rock, or iron-rich sediments.

4. The method of claim 1, wherein the subsurface formation comprises a porous, faulted, or geologically or incipiently fractured rock formation.

5. The method of claim 1, further comprising heating the reactant prior to injecting the reactant into the subsurface formation, wherein the reactant is heated from a source external to the subsurface formation.

6. The method of claim 1, further comprising fracturing or stimulating the subsurface formation.

7. The method of claim 1, wherein the reaction comprises one or more of a serpentinization reaction or a decarbonation reaction.

8. The method of claim 1, wherein the subsurface formation comprises a natural geothermal system.

9. A method of producing hydrogen from a subsurface rock formation, comprising:
   injecting a thermal fluid into the subsurface rock formation, wherein the thermal fluid comprises a reactant and is heated by a heat source external to the subsurface rock formation and the reactant comprises one or more of dihydrogen sulfide and carbon dioxide;
   reacting, via a pyritization reaction, the reactant with components in the subsurface rock formation to form hydrogen gas and mineralized sulfur; and
   collecting the hydrogen gas produced from a reaction of the reactant with the subsurface rock formation and sequestering the mineralized sulfur within the subsurface rock formation.

10. The method of claim 9, wherein the subsurface rock formation comprises one or more of iron-rich rock, mafic igneous rock, metamorphosed or hydrothermally altered mafic igneous rock, olivine- or pyroxene-bearing igneous or metamorphic rock, metamorphosed or hydrothermally altered olivine- or pyroxene-bearing igneous or metamorphic rock, serpentine mineral bearing rock or sediment, partially or completely serpentinized rock, serpentinite, pyrite, iron-rich sandstone, other iron-rich sedimentary rock, or iron-rich sediments.

11. The method of claim 9, wherein the thermal fluid comprises at least one of water, steam, brine, geothermal fluid, or waste heat fluid.

12. The method of claim 9, wherein the thermal fluid comprises a super-critical fluid.

13. The method of claim 9, wherein the subsurface rock formation comprises a porous, faulted, geologically or incipiently fractured rock formation, or a natural geothermal system.

* * * * *